(12) United States Patent
Durairaj

(10) Patent No.: US 6,303,732 B1
(45) Date of Patent: Oct. 16, 2001

(54) DIOL BLENDS AND METHODS FOR MAKING AND USING THE SAME

(75) Inventor: Raj B. Durairaj, Monroeville, PA (US)

(73) Assignee: Indspec Chemical Corporation, Pittsburgh, PA (US)

( * ) Notice: Subject to any disclaimer, the term of this patent is extended or adjusted under 35 U.S.C. 154(b) by 0 days.

(21) Appl. No.: 09/394,209

(22) Filed: Sep. 10, 1999

(51) Int. Cl.$^7$ .................................................. C08G 18/10
(52) U.S. Cl. .................. 528/79; 252/182.27; 152/151; 473/351; 528/65
(58) Field of Search ...................... 252/182.27; 152/151; 473/351; 528/65

(56) References Cited

U.S. PATENT DOCUMENTS

| | | |
|---|---|---|
| Re. 31,671 | 9/1984 | Bonk et al. . |
| 3,577,385 | 5/1971 | Feltzin et al. . |
| 4,098,772 | 7/1978 | Bonk et al. . |
| 4,120,850 | 10/1978 | Pechhold . |
| 4,485,719 | 12/1984 | Mendelsohn et al. . |
| 4,604,940 | 8/1986 | Mendelsohn et al. . |
| 4,739,027 | 4/1988 | Mendelsohn et al. . |
| 4,990,545 | 2/1991 | Hourai et al. . |
| 5,059,723 | * 10/1991 | Dressler ................................. 568/45 |
| 5,496,496 | 3/1996 | Kajita et al. . |
| 5,545,706 | 8/1996 | Barksby et al. . |
| 5,750,586 | 5/1998 | Adams et al. . |
| 5,959,059 | * 9/1999 | Vedula et al. .......................... 528/76 |

FOREIGN PATENT DOCUMENTS

WO98/56845  12/1998  (WO) .

OTHER PUBLICATIONS

Mendelsohn et al., *Characteristics of a Series of Energy–Absorbing Polyurethane Elastomers*, Rubber Chemistry and Technology, pp. 997–1013, vol. 58; 1985.

* cited by examiner

*Primary Examiner*—Rachel Gorr
(74) *Attorney, Agent, or Firm*—Diane R. Meyers; Debra Z. Anderson; Eckert Seamans Cherin & Mellott, LLC

(57) ABSTRACT

Novel diol blends are disclosed. The blends are comprised of an aromatic diol portion derived from dihydric phenol and an aliphatic diol portion in a ratio of aromatic to aliphatic of 5:95 to 95:5. The aromatic portion is the reaction product of a dihydric phenol and one or more alkylene carbonates using a stoichiometric excess of carbonate. Methods for preparing these diol blends are also disclosed, as are methods for using these compounds in the preparation of cast elastomers. Cast elastomers prepared from these blends are also disclosed; the elastomers have physical and mechanical properties that make them appropriate for use in many demanding applications.

20 Claims, 6 Drawing Sheets

DIOL BLENDS AND METHODS FOR MAKING AND USING THE SAME

FIELD OF THE INVENTION

The invention relates to new and improved diol blends and methods for making and using the same. The present compounds are useful as chain extenders and plasticizers, and are particularly suited for use in the production of cast polyurethanes.

BACKGROUND OF THE INVENTION

Cast polyurethanes have a wide range of applications due to their unique combination of valuable physical and mechanical properties. In general, these elastomers can be prepared by the extension reaction of either polyether or polyester based isocyanate prepolymers with diol or diamine type chain extenders. Chain extenders are used to extend the hard segments in an elastomer. Both aliphatic and aromatic diol chain extenders are known in the art of cast polyurethanes. The most common aliphatic diol chain extender is 1,4-butanediol ("BD"). Common aromatic diol chain extenders include, for example, the bis-(β-hydroxyethyl) ethers of resorcinol and hydroquinone. Drawbacks to the use of BD and the hydroquinone ether, however, exist. For example, while the hydroquinone ether yields suitable properties in the finished product, it often can't be used or isn't desirable to use because it requires high temperatures during processing. BD is processable at lower temperatures, but often fails to yield products with the desired properties.

Both polyether and polyester based elastomers have excellent tensile strength, abrasion resistance, and load bearing characteristics far superior to other elastomeric materials. To achieve an optimum performance for a particular application, various chain extenders are being used with toluene diisocyanate ("TDI") and 4,4' diphenylmethane diisocyanate ("MDI") terminated prepolymers based on polyether or polyester polyols. In the case of MDI-terminated prepolymers, 1,4-butanediol ("BD") is the most commonly used chain extender. Though the physical and mechanical properties of elastomers based on butane diol chain extenders are excellent, these elastomers have limited thermal stability.

Addition of both aromatic diols such as the bis-(βhydroxyethyl) ethers of resorcinol and hydroquinone to polyurethanes helps to maintain mechanical properties of the polyurethanes at elevated temperatures. Although bis-(βhydroxyethyl) ether of resorcinol and bis-(βhydroxyethyl) ether of hydroquinone possess similar molecular structures, they have different processing characteristics in the cured elastomers. For example, bis-(βhydroxyethyl) ether of hydroquinone has a substantially higher melting point than bis-(βhydroxyethyl) ether of resorcinol, about 102° C. versus about 89° C. In order to use bis-(βhydroxyethyl) ether of hydroquinone in cast urethane applications, the mixture must be processed at temperatures higher than 100° C. and possibly as high as 120°–130° C. If lower temperatures are used, then "starring" occurs due to localized concentration of bis-(βhydroxyethyl) ether of hydroquinone in the elastomer system. To overcome the processing problems associated with bis-(βhydroxyethyl) ether of hydroquinone, bis-(βhydroxyethyl) ether of resorcinol is used, as its lower melting point allows for a more forgiving chemistry and greater processing ease.

Other discussions of common chain extenders are found, for example, in Mendelsohn et al., *Rubber Chemistry And Technology*, "Characteristics Of A Series Of Energy Absorbing Polyurethane Elastomers" Vol. 58, pp. 997–1013, April 1985; that article discusses the need for polyurethanes having specialized "soft-hard" engineering applications, such as damping vibration, mitigating shock, and also providing rigid structured members with "soft-hard" characteristics. Extenders, such as 2-ethyl-1,3-hexanediol ("EHD"), BD, dipropylene glycol ("DPG"), bis-(βhydroxyethyl) ether of resorcinol, and bis-(βhydroxyethyl) ether of hydroquinone, were reported as being used in polyurethanes. Mendelsohn et al., U.S. Pat. Nos. 4,485,719 and 4,604,940, further disclose elastomeric materials requiring specialized properties of both strength and rigidity for aerospace missile launch pads and flexible missile shock isolator pads. These materials used bis-(βhydroxyethyl) ether of hydroquinone as the sole chain extender for their polyurethane formulations.

International Application WO 98/56845 discloses thermoplastic polyether polyurethanes prepared by reacting a diisocyanate with a hydroxy terminated polyether having a molecular weight of at least 1,400 and a glycol chain extender. The application does not disclose the use of diisocyanate prepolymers or their combination with a diol blend chain extender.

U.S. Pat. No. Re 31,671 discloses a thermoplastic polyurethane prepared by reacting an isocyanate with a polyoxypropylene polyoxyethylene block copolymer and a chain extender; the chain extender is selected from aromatic and aliphatic diols and mixtures thereof.

U.S. Pat. No. 5,545,706 discloses a polyurethane elastomer comprising a prepolymer reacted with a glycol chain extender having an isocyanate index of about 70 to 130. The prepolymer is prepared by reacting a polyisocyanate having a functionality of 2 to 2.2, a polytetramethylene ether glycol having a molecular weight of between 600 and 6000 daltons, and 1 to 10 weight percent of a hydroxyl-functional polyoxyalkylene monol. The patent does not teach or suggest the reaction of the prepolymers used herein in conjunction with a diol blend chain extender.

U.S. Pat. No. Re 31,671 discloses a thermoplastic polyurethane prepared by reacting an isocyanate with a polyoxypropylene polyoxyethylene block copolymer and a chain extender; the chain extender is selected from aromatic and aliphatic diols and mixtures thereof.

U.S. Pat. No. 4,120,850 also teaches polyether urethane polymers. The polymers are the reaction product of a difunctional copolymer of tetrahydrofuran and ethylene or propylene oxide, an organic isocyanate, and an aliphatic diol having 2 to 10 carbon atoms. The use of the present diol blend is not taught or suggested.

Cast polyurethanes, also known as cast elastomers, are much more "high tech" than their thermoplastic counterparts and are prepared in a significantly different manner. Thermoplastic polyurethanes are typically prepared by mixing an isocyanate compound, a polyol, and a chain extender in the same reaction vessel. The result is a molecule containing alternating isocyanate and diol groups, wherein the diol can be either the relatively short chain extender or the relatively long polyol. Thus, thermoplastic urethane polymers have a random configuration. Higher performance properties than those provided by thermoplastic urethane technology are often required. An isocyanate prepolymer is a compound in which a relatively long chain polyol is capped on either end with an isocyanate compound. Prepolymer molecules are linked together by means of a chain extender. The use of isocyanate prepolymers, rather than isocyanate alone, allows the user to engineer the final polymer by better distribution of the hard and soft segments of the polymer. "Soft" segment refers to the polyol segment within the prepolymer, i.e., the portion of the molecule between the two isocyanates of each prepolymer group. "Hard" segments refers to the remaining portion of the molecule from the end isocyanate on one prepolymer group through the chain extender to the beginning isocyanate on the next prepolymer group. Typically the hard segment contains the aromatic groups. Performance of a polyurethane depends on the phase separation between the hard and soft segments of the elastomer. Having hard and soft segments as distinct from each other as possible therefore yields optimum properties in the final product.

The cast polyurethane industry is looking for chain extenders that improve the processing capabilities and enhance the physical and mechanical properties of the cured materials. Thus, there remains a need for improved chain extenders for these and other applications.

SUMMARY OF THE INVENTION

The present invention has met the above need by providing diol blend chain extenders that can be used in numerous applications, including as a combination chain extender/plasticizer in cast elastomers. The present compounds allow for extension of the hard segment, which yields better properties in the final product. For example, the present compounds impart excellent thermal stability and physical and mechanical properties to elastomers prepared with the present diol blend. Novel methods for preparing the present compounds are the further subject of the present invention, as are the elastomers produced with these chain extenders.

The present chain extenders can be generally described as a blend comprising an aromatic diol portion and an aliphatic diol portion. The aromatic diol portion derives from either resorcinol or hydroquinone, whereas the aliphatic diol portion derives from a polyol. The chain extenders can be reacted with diisocyanate prepolymers, resulting in novel cast elastomers having properties comparable to or greater than those made using current chain extenders, while providing greater processing ease.

It is therefore an object of the present invention to provide novel diol compounds having broad application in numerous industries.

It is a further object of this invention to provide such compounds in liquid form, semi-liquid form or as low melting point solids.

Another object of this invention is to provide methods for preparing the present aromatic diol compounds.

Yet another object of this invention is to provide products having improved mechanical and physical properties through use of the present compounds.

Another object of the present invention is to increase processing ease in the preparation of cast elastomers.

These and other objects of the invention will be apparent to those skilled in the art based upon the following disclosure and appended claims.

BRIEF DESCRIPTION OF THE TABLES

Figure 1:
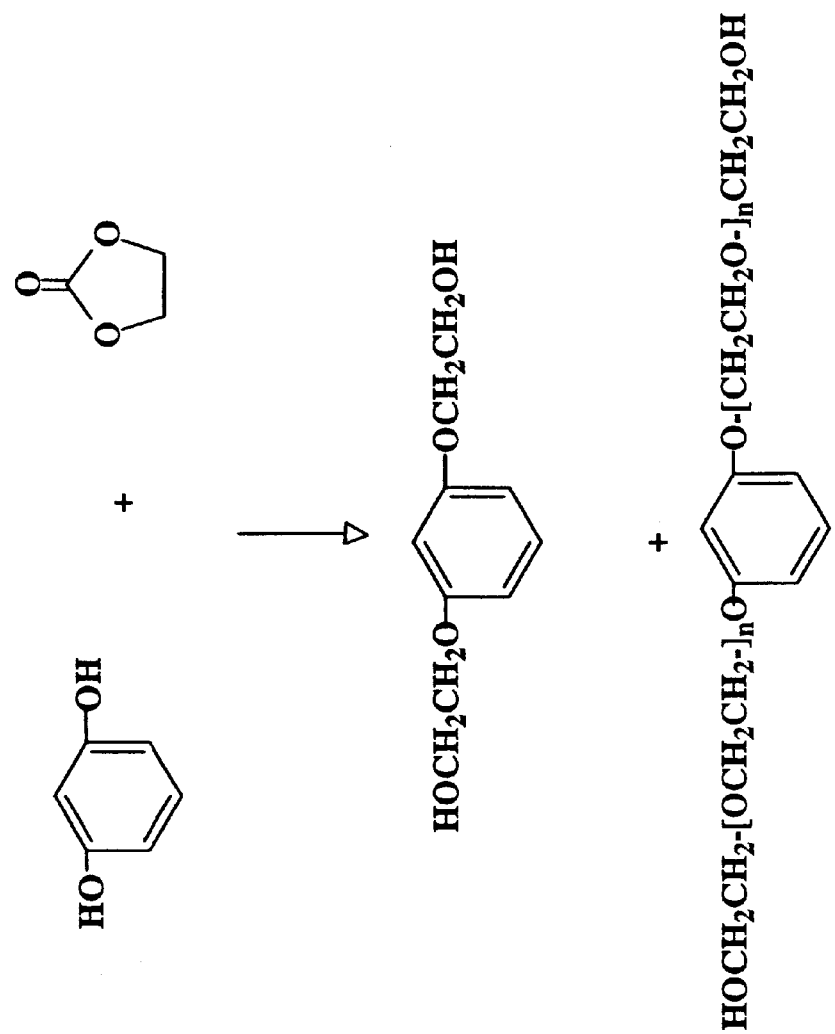
FIG. 1 illustrates a reaction scheme for preparing the aromatic diol portion of the present diol blends.

Table 1 shows the melting behavior (DSC analysis) of the diol blends of the present invention, as described in Example 6.

Table 2 provides information on cast elastomers prepared using a prepolymer having a 5.8% NCO content and the present diol blends, as described in Example 7.

Table 3 provides results of DSC analysis of the present cast elastomers prepared using a prepolymer having a 5.8% NCO content, as described in Example 8.

Table 4 provides DMA results of the present cast elastomers prepared using a prepolymer having a 5.8% NCO content, as described in Example 8.

Table 5 provides DMA results of 110° C./28 days heat aged cast elastomers prepared using a prepolymer having a 5.8% NCO content, as described in Example 9.

Table 6 provides DMA results of 150° C./6 days heat aged cast elastomers prepared using a prepolymer having a 5.8% NCO content, as described in Example 9.

Table 7 provides results of DSC analysis of 110° C./28 days heat aged elastomers prepared using a prepolymer having a 5.8% NCO content, as described in Example 9.

Table 8 provides results of DSC analysis of 150° C./6 days heat aged elastomers prepared using a prepolymer having a 5.8% NCO content, as described in Example 9.

Table 9 provides results of hydrolysis resistance testing of the present cast elastomers prepared using a prepolymer having a 5.8% NCO content, as described in Example 10.

Table 10 provides results of hydrolysis resistance testing of the present cast elastomers prepared using a prepolymer having a 5.8% NCO content, as described in Example 10.

Table 11 provides information on cast elastomers prepared using a prepolymer having a 6.5% NCO and the present diol blends, as described in Example 11.

Table 12 provides results of DSC analysis of the present cast elastomers prepared using a prepolymer having a 6.5% NCO content, as described in Example 11.

Table 13 provides DMA results of the present cast elastomers prepared using a prepolymer having a 6.5% NCO content, as described in Example 11.

Table 14 provides information on cast elastomers prepared using a prepolymer having an 8.0% NCO and the present diol blends as described in Example 12.

Table 15 provides results of DSC analysis of the present cast elastomers prepared using a prepolymer having an 8.0% NCO content, as described in Example 12.

Table 16 provides DMA results of the present cast elastomers prepared using a prepolymer having an 8.0% NCO content, as described in Example 12.

Table 17 provides hydrolysis resistance analysis of the present cast elastomers prepared using a prepolymer having an 8.0% NCO content, as described in Example 12.

Table 18 provides information on the aromatic/aliphatic diol blends of the present invention, as described in Example 13.

Table 19 provides information on cast elastomers prepared using a prepolymer having an 5.8% NCO and the present diol blends, as described in Example 13.

DETAILED DESCRIPTION OF THE INVENTION

The present invention is generally directed to diol blends and methods for making and using the same. The term "blend" as used herein refers to the physical mixture of two different diol portions. More specifically, the present invention is directed to a diol blend comprising an aromatic diol portion and an aliphatic diol portion. The aromatic diol portion is the reaction product of resorcinol or hydroquinone (collectively referred to herein as "dihydric phenol") and one or more alkylene carbonates, using a stoichiometric excess of carbonate. The ratio of dihydric phenol to carbonate is therefore 1 mole dihydric phenol to greater than 2 moles carbonate. The aliphatic diol portion is a polyol.

The reaction of resorcinol or hydroquinone with one or more alkylene carbonates in a ratio of 1:2 results in the production of bis-($\beta$hydroxyethyl) ether of resorcinol. Use of greater than about 2 moles, typically about 2.05 moles, of alkylene carbonate, however, results in a mixture of compounds, each compound having the general formula (1):

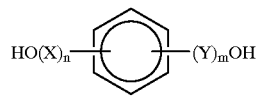

(1)

wherein each X and Y is the same or different and is independently selected from the group consisting substituted or unsubstituted alkoxy groups. The X and Y groups can be attached to the benzene ring in either the meta or para positions relative to each other, depending on whether resorcinol or hydroquinone is used as the source of the benzene ring. These X and Y groups can be straight chain, branched chain or cyclic and are derived from the alkylene carbonates as discussed below. In a preferred embodiment the values of n and m are also independently selected and range from between about 1 and 4.

Thus, on each side of the benzene ring there will be at least one but as many as 4 for "X" or "Y" groups, respectively. Just as the "X" and "Y" values can be different, if there is more than one X or Y in a compound (i.e., n or m is 2 or greater) each of the X or Y groups can be the same or different. The formulas used herein are therefore intended to illustrate that each "diol" portion of the present high molecular weight compounds can have mixed ether linkages.

As noted above, the molar ratio of dihydric phenol to alkylene carbonate should be 1 to greater than 2. Carbonate molar ratios in excess of 2, when reacted with 1 mole of dihydric phenol, will yield a mixture of hydroxyalkylated phenolic compounds, all of which have the general formula (1) described above. FIG. 1 depicts the reaction of 1 mole of resorcinol with between about 2.05 and 3.0 moles of ethylene carbonate. The reaction products include bis-($\beta$hydroxyethyl) ether of resorcinol, and one or more additional hydroxyalkylated phenols referred to herein as a "high molecular weight aromatic diol". For bis-($\beta$hydroxyethyl) ether of resorcinol, each X and Y equal $C_2H_4O$ and appear only once; for the high molecular weight aromatic diol, each X and Y equal $C_2H_4O$ and there are at least 2 but as many as 5 of each of these groups. Thus, the sum of n+m in formula (1) is, on average, greater than 2. At a resorcinol to carbonate ratio of about 1:2.1, the reaction products bis-($\beta$hydroxyethyl) ether of resorcinol and high molecular weight aromatic diol are present in weight percents of about 93 and 7, respectively. Such a product is commercially available from INDSPEC Chemical Corporation as HER™ TG-210. At a resorcinol to carbonate ratio of about 1:2.5, the reaction products bis-($\beta$hydroxyethyl) ether of resorcinol and two different high molecular weight aromatic diols are present in weight percents of between about 65–80, 20–30 and 1–5; for the first high molecular weight aromatic diol, X and Y are the same and n and m are both equal to 2 and for the second X and Y are the same and n and m are both equal to 3.

As the molar ratio of carbonate is increased, the higher the weight percent of the high molecular weight aromatic diol in the reaction product. Also, as the molar ratio of carbonate increases, the molecular weight of the high molecular weight aromatic diol will increase; in other words n and m will be of a higher value. Adjusting the molar ratio by increasing the amount of carbonate will therefore alter the percent of bis-($\beta$hydroxyethyl) ether of resorcinol to high molecular weight aromatic diol in the final product. It is an advantage of the present invention that the user can select the ratio of resorcinol to carbonate that will give the desired aromatic diol portion for the present diol blends. Even small amounts (i.e., 5%) of one or more high molecular weight aromatic diols in the aromatic diol portion will result in enhanced miscibility in cast elastomer production, which leads to enhanced properties of the cast elastomers produced. In addition, different ratios can yield either liquid, semi-liquid or low melting solid products. "Low melting" as used herein means melting at less than about 100° C. For example, use of resorcinol and carbonates in a molar ratio of about 1:4 will result in a liquid aromatic diol. Even higher ratios are within the scope of the invention. The needs and desires of the user, along with the particular application, will determine the optimum ratio of dihydric phenol to alkylene carbonate compound; such determination is well within the skill of those practicing in the art.

As is discussed further below, the composition of each of the X and Y groups will vary depending on the alkylene carbonate or carbonates utilized to make the compound. In a preferred embodiment each X and Y are independently selected and have the general formula $C_aH_{2a}O$, wherein a is between 2 and 5. A preferred embodiment within this general formula include the compounds in which X and Y are the same, n and m are both equal to 2 and a is equal to 2.

The alkylene carbonate compounds used according to the present invention are cyclic compounds having the general formula (2):

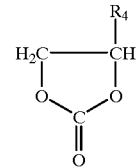

(2)

wherein R is selected from the group consisting of H, and alkyl groups of $C_1$–$C_8$ carbon atoms. Alkylene carbonates wherein R is H or $CH_3$ are preferred for use with the present invention, specifically ethylene carbonate, propylene carbonate and mixtures thereof. Another suitable compound includes, for example, 1,2-butylene carbonate. If the carbonates are in solid form, they are preferably melted before use. In addition, in some instances ethylene oxide and/or propylene oxide can be employed in place of or in addition to the cyclic organic carbonates described.

The aromatic diol portion of the present composition can be prepared as generally described in U.S. Pat. No. 5,059,723. Basically, preparation of the aromatic diol portion of the present blends comprises mixing a dihydric phenol with one or more alkylene carbonates, heating the mixture, and cooling the mixture to less than 100° C. Preferably, the mixture also includes a catalyst, more preferably a triorganophosphine catalyst. It will be appreciated that during the reaction between dihydric phenol and the alkylene carbonate or carbonates, $CO_2$ will be given off. The temperature at which the reaction is performed should be sufficient to initiate and maintain the evolution of $CO_2$. This is typically in the range of 150°–225° C. The reaction will be run to completion, therefore, when $CO_2$ is no longer generated. Thus, the reaction should be maintained for a length of time sufficient to achieve the desired reaction between the starting materials. Typically this will be the amount of time needed to complete the reaction, as evidenced by the $CO_2$ no longer being evolved. This period of time will vary depending on the nature and volume of the starting ingredients but will typically not be less than about 2 hours. The reaction is preferably performed in an inert environment, such as an inert atmosphere of either $CO_2$ and/or $N_2$.

Triorganophosphine compounds useful as the catalyst in the present reactions are represented by formula (3):

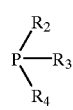

(3)

wherein $R_2$, $R_3$ and R4 are independently selected from alkyl groups, aryl groups, alkylaryl groups or mixtures thereof. The triorganophosphine compound may be triaryl, trialkyl, trialkylaryl, or mixed aryl/alkyl. Examples of such catalysts include triphenylphosphine, tributylphosphine, diphenylbutylphosphine and dibutylphenylphosphine. The preferred catalysts are triarylphosphines, particularly triphenylphosphine. Triorganophosphine compounds are widely commercially available, or can be made using the Grignard reaction, which will be known to those skilled in the art.

The amount of triorganophosphine compound necessary to effectively catalyze the present reaction will vary depending on the particular cyclic organic carbonate or carbonates and the particular triorganophosphine compound. The amount of catalyst is also dependent on desired reaction time, temperature and pressure. In general, the amount of catalyst will be between 0.0005 wt% to 5 wt% based on the weight of the dihydric phenol. Preferably, the catalyst will be between 0.003 and 2 percent by weight based on the weight of the phenolic compound.

The triorganophosphine catalyst may be used alone or in combination with other known hydroxyalkylation catalysts, such as alkali and alkali earth metal salts, hydroxides, carbonates, etc. Similarly, these alkali metal and alkali earth metal catalysts can be used alone. The catalyst may be utilized in an unsupported state or in a supported state. Suitable supports include alumina, silica gel, diatomaceous earths, porous gas, zeolites, clays, and activated carbons. The methods of supporting the catalyst or the substrates are well known in the catalysis art. It is preferred that the triorganophosphine catalyst be used as the only catalyst and be used in the unsupported state.

The reaction of the dihydric phenolic compound with the cyclic organic carbonate in the presence of the triorganophosphine catalyst may take place in the presence or absence of appropriate solvents. The use of a solvent will be dependent on the particular phenolic compound, cyclic organic carbonate and catalyst being used. In the preferred embodiment solvents are not necessary.

As noted above, preparation of the aromatic diol portion of the present invention may be run at any temperature and for any length of time suitable to drive off all or nearly all of the $CO_2$. Monitoring the $CO_2$ generation is one means by which to determine when the reaction is complete. Because the most complete reaction of dihydric phenol and alkylene carbonate possible would be desired to optimize utilization of starting materials and give a pure product, it is therefore desired to drive off as much $CO_2$ as possible. Generally, a suitable temperature will be between 150° C. and 225° C. The total reaction time will typically not be less than about 2 hours but can be as high as about 20 hours or longer, depending on batch size.

It will be understood that the alkylene carbonate or carbonates can be reacted with the dihydric phenol in different stages. That is, a first carbonate compound can be reacted with the dihydric phenol in the presence of a triorganophosphine catalyst for a given amount of time. In a second stage an additional carbonate, which can be the same or different from the first carbonate, can be further reacted with the mixture. As many stages as desired can be employed, as long as the final desired ratio of 1 to greater than 2 is achieved.

Various embodiments of the method for preparing the aromatic diol portion of the present blends are further illustrated in FIGS. 2–6. When a resorcinol:carbonate molar ratio of about 1:4 is used, the predominant hydroxyalkyl phenyl ether is one or more high molecular weight aromatic diols depicted in Formula 1, wherein n and m are 2 or greater. These figures generally represent preferred embodiments wherein resorcinol is reacted with ethylene and/or propylene carbonate, and triphenylphosphine is the catalyst. It will be appreciated by those skilled in the art, however, that these reaction schemes are representative of either dihydric phenol and any alkylene carbonates or catalysts within the scope of the present invention. It will be further appreciated that the products depicted in FIGS. 2–6 represent what is believed to be the predominant isomer formed during the reaction, but that a distribution of isomers would actually be formed; the aromatic diol portion of the present invention therefore encompasses all such isomers. In addition, non-symmetrical distribution of the alkoxy group does occur, and higher or lower molecular weight species can be formed in addition to those shown in the Figures. Finally, while certain primary and secondary hydroxyl substituents are shown, other variations are possible in both the intermediate and final products.

Figure 2:
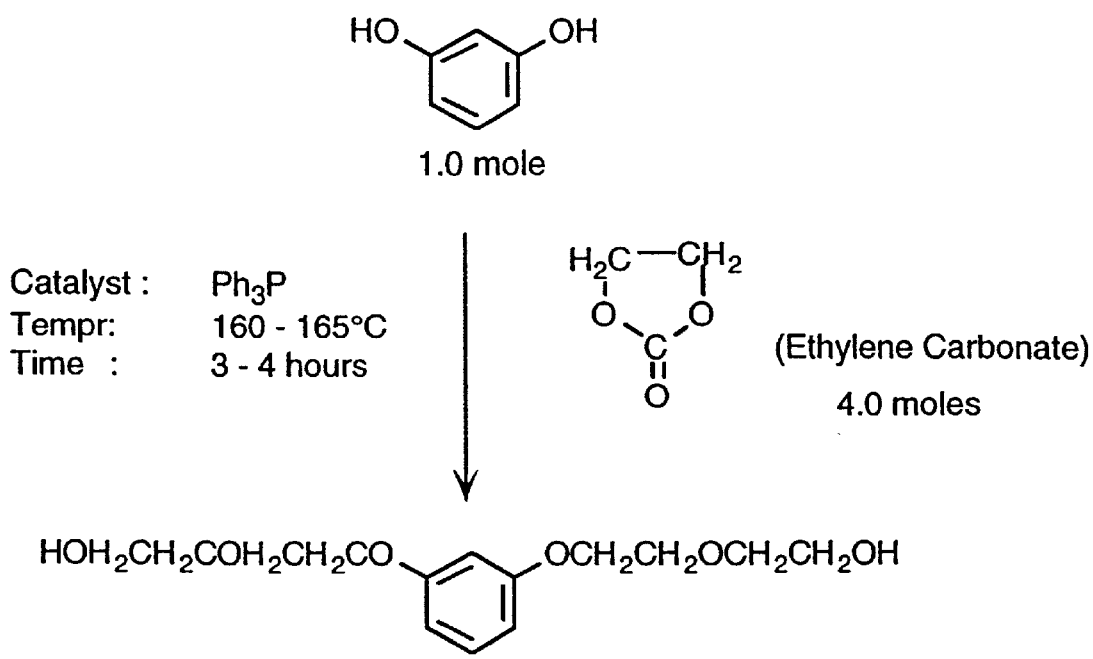
FIG. 2 illustrates a reaction scheme wherein resorcinol is reacted with ethylene carbonate to prepare the aromatic diol portion of the present blends.
Figure 3:
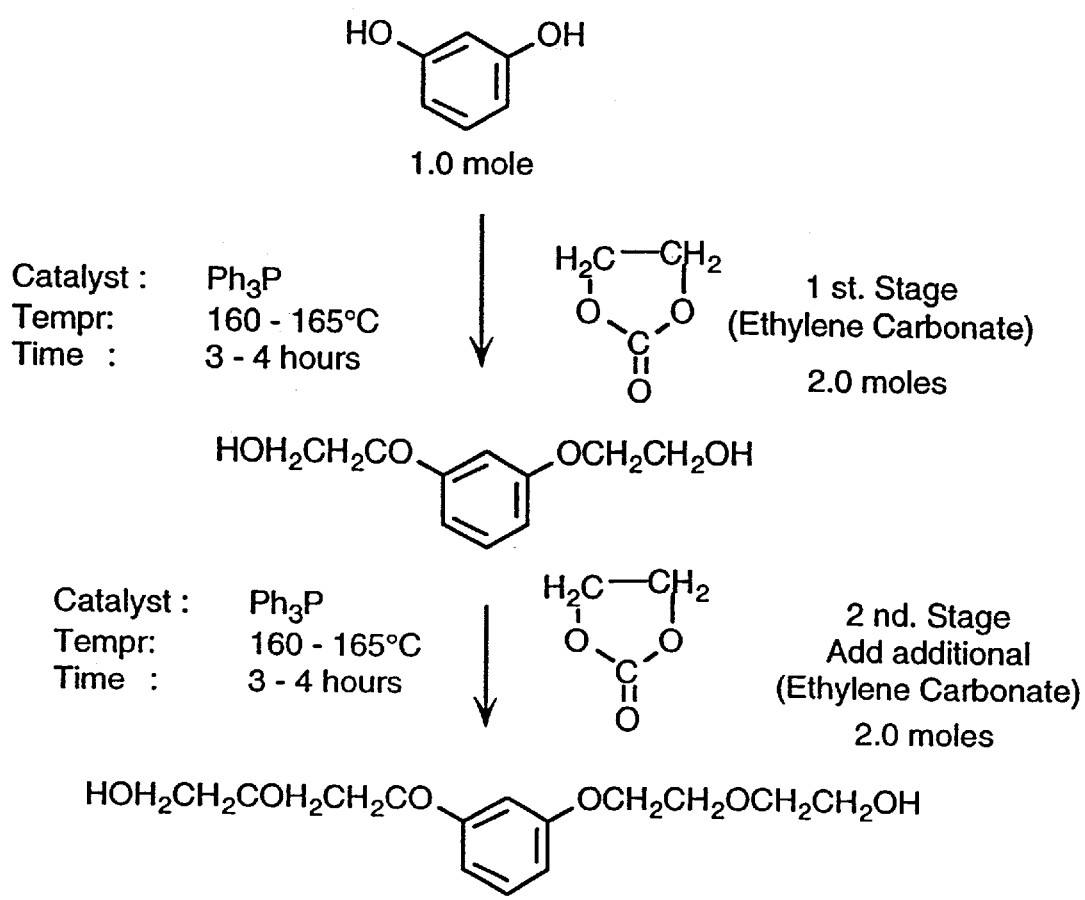
FIG. 3 illustrates a reaction scheme wherein resorcinol is reacted with ethylene carbonate in two stages to prepare the aromatic diol portion of the present blends.
Figure 4:
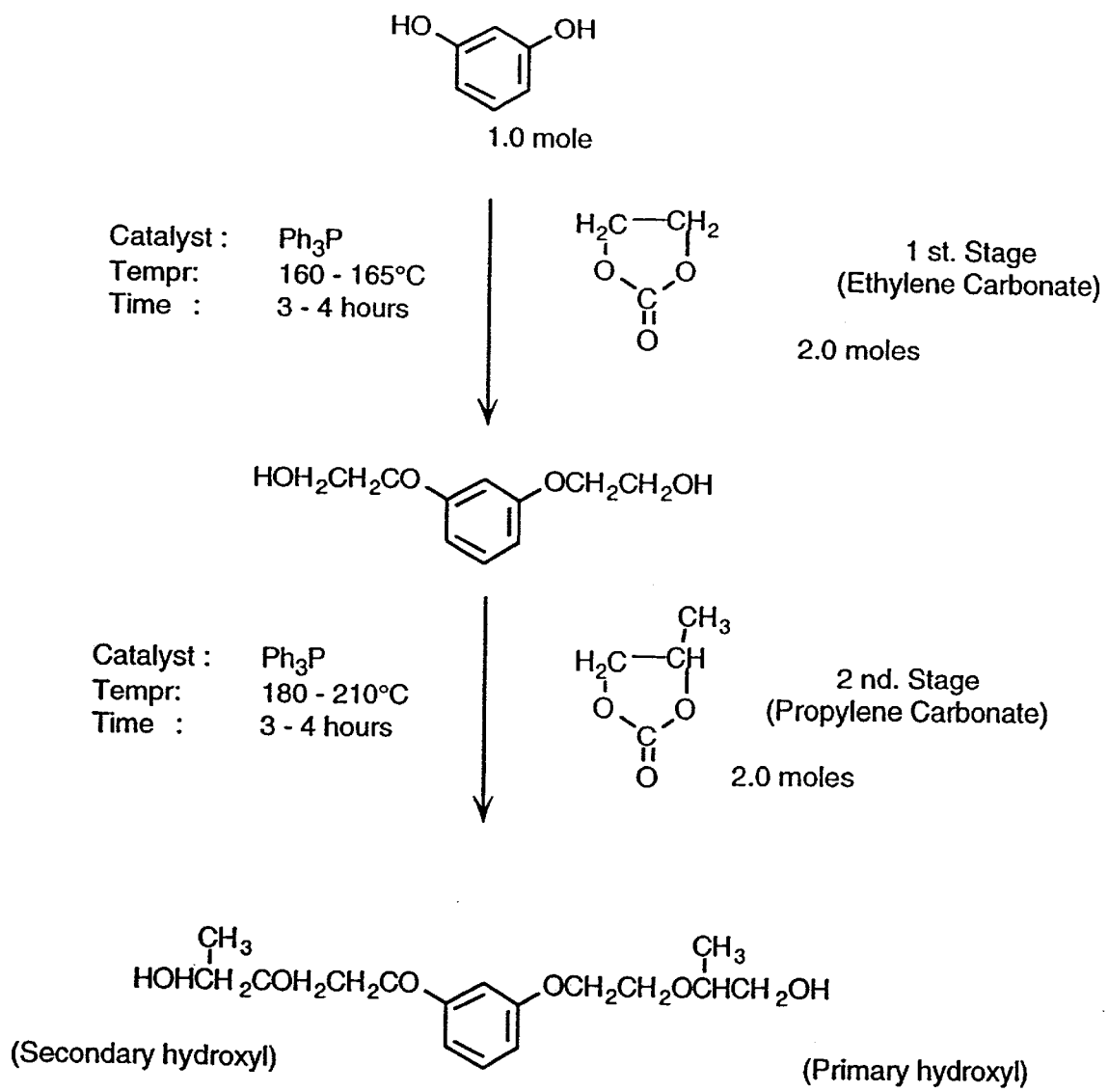
FIG. 4 illustrates a reaction scheme wherein resorcinol is reacted first with ethylene carbonate and then with propylene carbonate in two stages to prepare the aromatic diol portion of the present blends.

For example, FIG. 2 depicts the reaction of one mole of resorcinol with four moles of ethylene carbonate. In FIG. 3, one mole of resorcinol is reacted with two moles of ethylene carbonate to form the intermediate product bis-(βhydroxyethyl) ether of resorcinol; the intermediate is then further reacted with two additional moles of ethylene carbonate. FIG. 4 depicts the same first stage as that described for FIG. 3. The intermediate product, however, is then further reacted with two moles of propylene carbonate.

Figure 5:
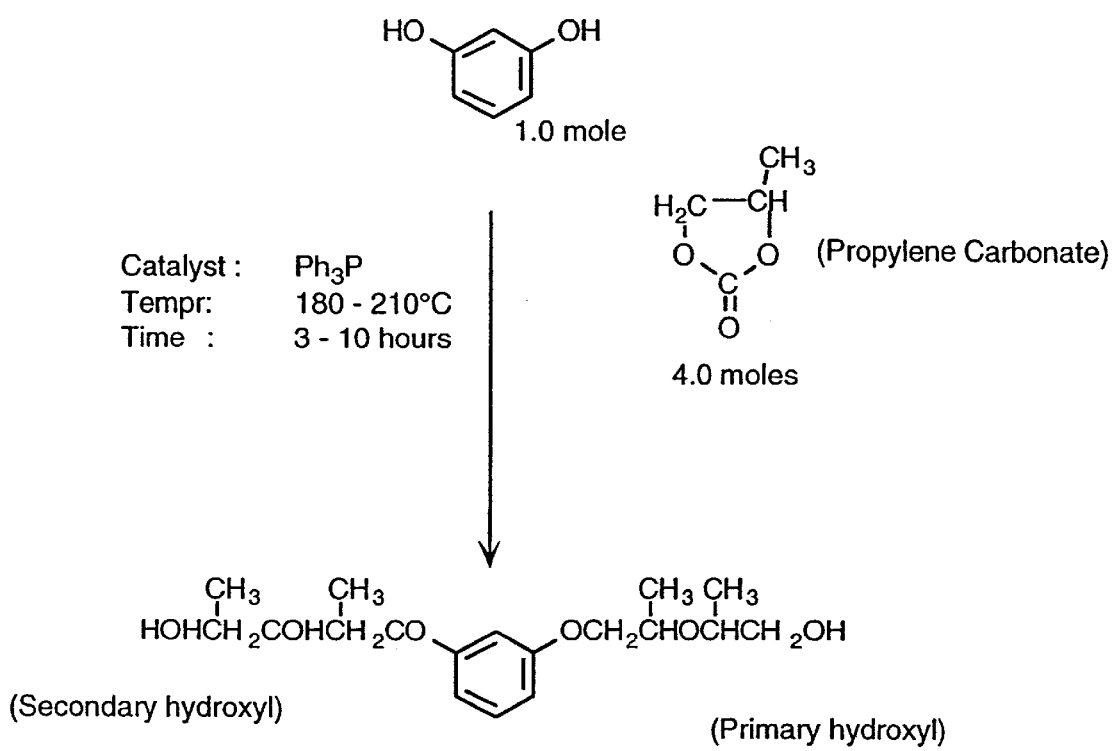
FIG. 5 illustrates a reaction scheme wherein resorcinol is reacted with propylene carbonate to prepare the aromatic diol portion of the present blends.
Figure 6:
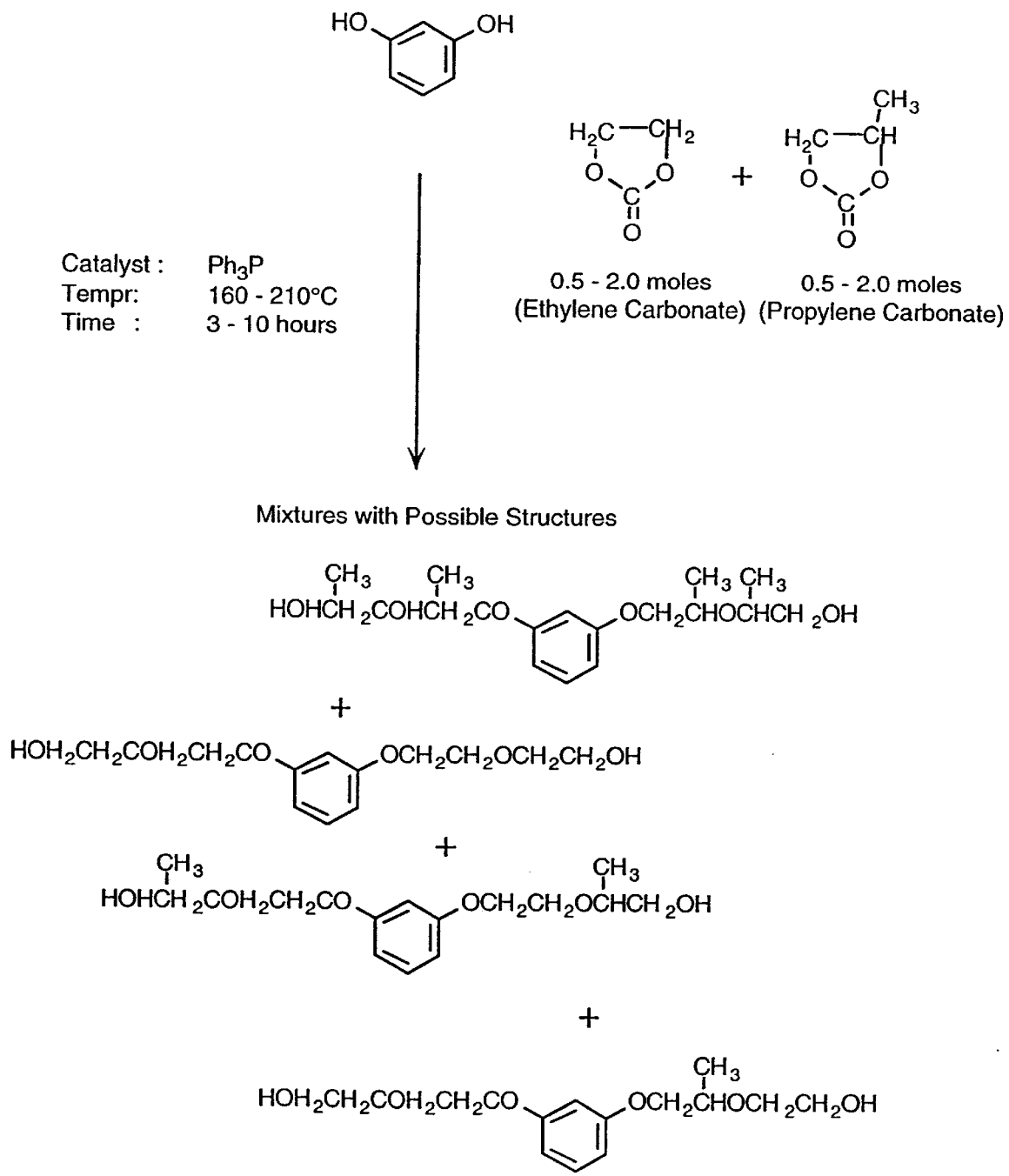
FIG. 6 illustrates a reaction scheme wherein resorcinol is reacted with a mixture of propylene carbonate and ethylene carbonate to prepare the aromatic diol portion of the present blends.

In FIG. 5, one mole of resorcinol is reacted with four moles of propylene carbonate and FIG. 6 depicts the reaction of one mole of resorcinol with a mixture of both ethylene carbonate and propylene carbonate. The two carbonates are present in amounts ranging between 0.5 and 2.0 moles, with the total moles of carbonate being greater than 2.

The aliphatic diol portion of the present blend/composition is derived from a polyol. A polyol is a polyhydric alcohol, having two or more hydroxyl groups. While use of any polyol is within the scope of the present invention, examples of suitable polyols include polyethylene adipate, polybutylene adipate, polycaprolactane diol, and other similar compounds. Preferred is polytetramethylene ether glycol ("PTMEG"). PTMEG is commercially available from DuPont in its Terathane® line of products. Various molecular weight Terathane® products are available, ranging from 650 to 2900. The molecular weight of the polyol according to the present invention is preferably within the range of about 650 to 2900, more preferably 1000 to 2000. More than one polyol, or the same polyol with more than one molecular weight, can be used according to the present invention. A preferred combination is Terathane® 1000 and Terathane® 2000, each of which is a PTMEG product having a molecular weight of 1000 and 2000, respectively. Use of lower molecular weight polyols will result in a blend that is more fluid, having a lower melting point and viscosity; using polyols with a higher molecular weight results in the opposite properties. Accordingly, the needs and desires of the user determine the appropriate molecular weight or weights to use in any given blend.

One of the many advantages of using the diol blend of the present invention is its low melting point. Because the blend remains in liquid form at approximately 70° C. or lower, a lower processing temperature can be used when preparing cast elastomers with these diol blends. Thus, while some chain extenders provide ease of processability but give poor properties, and other chain extenders are hard to process but give desirable properties, the diol blends of the present invention provide both ease of processability and desired properties. These blends therefore provide a significant advantage over other chain extenders known in the art.

The ratio of aromatic to aliphatic diol in the present blends will vary depending on the needs of the user, but can range from between 5:95 to 95:5. A preferred ratio is 30 to 70, aromatic to aliphatic. This ratio gives overall physical and mechanical properties in cured cast elastomers for major applications. One skilled in the art can determine the optimum ratio based on the desired end use.

The diol blends of the present method can be prepared by simply mixing the aromatic diol portion, prepared as described above or obtained commercially, with the aliphatic diol portion. Alternatively, the aromatic diol portion can be prepared as described above by reacting dihydric phenol with one or more alkylene carbonates, preferably in the presence of a triorganophosphine catalyst. As the reaction between the dihydric phenol and carbonate(s) comes to an end, as evidenced by the slowing down of $CO_2$ evolution, the polyol is added and the mixture stirred until blended. Typically, mixing for between about 15 and 60 minutes will provide a suitable blend time. This procedure is further described in the Examples below.

The present invention is also directed to a cast elastomer comprising an isocyanate prepolymer having an NCO group content of between about 2 and 23 weight percent and the diol blend described above. Any polyurethane prepolymer having this NCO content range can be used. Preferably, the prepolymer is an isocyanate prepolymer in which a diisocyanate has been reacted with a polyol. The higher the molecular weight of the polyol, the larger the soft segment in the elastomer. The prepolymer can be prepared, for example, according to the method taught by in U.S. Pat. No. 5,545,706. Appropriate prepolymers are also commercially available, including Baytec® ME-050 (5.9% NCO), Baytec® ME-080 (8% NCO) and Baytec® MS-242 (6.6% NCO) available from Bayer; Versathane SME-90A (7.2% NCO) and Versathane SMS-85A (6.8% NCO) available from Air Products; and Vibrathane® B-65 (6.4% NCO), Vibrathane® 8520 (6.9% NCO) available from Uniroyal Chemical. As can be seen, the NCO content of these prepolymers differs. NCO content reflects the weight percent of NCO in the prepolymer molecule. The higher the NCO content, the higher the reacting and therefore the harder to process. More specifically, as the NCO content increases, the lower the temperature at which the cast elastomer can be prepared. As the processing temperature, and the corresponding reactivity, become lower, the pot life of the elastomer increases. The present invention overcomes the limitations of using prepolymers with high NCO contents by providing the novel chain extenders of the present invention, which allow for processing at lower temperatures. While these chain extenders allow for a much more processable material, they also result in a final elastomer product having the desired properties. In addition to cost considerations, certain applications may desire use of a prepolymer having a relatively high NCO. For elastomers with large quantities of hard segments, the NCO content of the prepolymer may be from 8–20%; for softer elastomers, the NCO content may be less that about 5%. Determination of the appropriate NCO content of the soft-segment prepolymer is within the skill of those practicing in the art.

Cast elastomers can be prepared according to the present invention by any means known in the art for preparing cast elastomers using the present diol blends as the chain extender. The present cast elastomers provide advantages over other elastomers known in the art. For example, the present elastomers offer higher thermal stability in polyurethanes than those obtained using BD extenders, and provide good physical and mechanical properties, including but not limited to high tensile strength and excellent rebound characteristics. In addition, the present diol blends offer lower melting points for better processing and increased pot-life with MDI-prepolymers. The present blends remain stable as liquids or low melting solids, and are applicable to "one-shot" methods wherein it is desirable to work at low temperatures allowing for use of high NCO content prepolymers that provide high end performance. A "one-shot" method will be understood as one in which all the reactants are brought together simultaneously. Use of other chain extenders is difficult if not impossible in these high NCO systems, or, if possible, does not provide the desired physical properties. Use of the compounds of the present invention in these applications also eliminates the need to use plasticizers and triol curatives, which are know to affect the physical and mechanical properties of the resins to which they are added.

The characteristics of the present elastomers can be altered to suit the needs of the user by changing the proportion of hard and soft segments in the final polymer. Altering the relative amounts of hard and soft segments influences a number of factors including hardness, flexibility, tensile strength, compression and processability at low temperatures. The use of the longer chain extenders of the present invention compared to BD will serve to extend the hard segment in applications where a longer hard segment is desired.

The present elastomers can also contain one or more additives such as fire retardants, mold release agents, flow control agents, pigments, dyes, fillers, lubricants, stabilizers, antioxidants and any other additive used in the polyurethane art.

Thus, the present invention is also directed to an elastomer composition and methods for making the same in which the present diol blends have been used as a chain extender and/or plasticizer. These urethane elastomers can be made by any means standardly reported in the art, with the addition of the present diol blends in place of the chain extenders and/or plasticizers reported as being used in those methods. The low melting point and ease of processability when using the present diol blends greatly improves these methods. It is believed that the easier processing is due to the supercooling behavior of the diol blend.

The elastomers prepared using the diol blends of the present invention can be utilized wherever cast elastomers having favorable properties are desired. For example, the present cast elastomers would be of particular interest for demanding applications such as in-line skate wheels, skate board wheels, golf balls, seals, gaskets, belts, couplings and drive shafts. It will be appreciated that this list is not exhaustive, and that the present cast elastomers can be used in any application wherein cast elastomers would be suitable.

Examples

The following examples are intended to illustrate the invention, and should not be construed as limiting the invention in any way. For all of the tables, ND=not determined and MW=molecular weight.

Example 1

To a 500 ml resin kettle equipped with a stirrer, thermocouple well, nitrogen ($N_2$) inlet, heating mantle and reflux condenser attached to a bubbler to monitor $N_2$ and/or carbon dioxide ($CO_2$) evolution rate was charged with 184.9 g (2.1 moles) of solid ethylene carbonate. The vessel was purged with $N_2$ for 30 minutes and heat was then applied to melt the ethylene carbonate. As the ethylene carbonate began to melt (35 to 40° C.), the stirrer was turned on and the stirring speed gradually increased until the molten ethylene carbonate was at a temperature of 50° C. At this point, 110.1 g (1.0 mole) of solid resorcinol was added and stirred until a clear liquid was obtained. The temperature was adjusted to 65 to 75° C. and 0.15 g (0.00057 mole) of solid triphenylphosphine was added to the reaction flask. The temperature of the reaction mass was gradually raised to 165° C. and a steady flow of $CO_2$ was evolving. At this point, the $N_2$ sparge was discontinued. Throughout the entire reaction process, as well as cool down intervals, an inert atmosphere of either $CO_2$ and/or $N_2$ was maintained. The mixture was heated for a period of 20.5 hours at which point the evolution of $CO_2$ became slow and erratic. The $N_2$ sparge was restarted and the reaction mixture was cooled to 110° C. and 87.0 g of Terathane® 2000 were added and stirred for an additional 30 minutes. The reaction mass was cooled to less than 100° C. giving a clear light yellow liquid. The yield was 292.2 g (101%) and the hydroxyl number was 401 (mg KOH/g sample) as compared to the calculated theoretical value of 402. Compositional analysis by proton NMR techniques showed the presence of a 69/31 weight ratio of aromatic to aliphatic diols.

Example 2

To a 500 ml resin kettle equipped with a stirrer, thermocouple well, nitrogen ($N_2$) inlet, heating mantle and reflux condenser attached to a bubbler to monitor $N_2$ and/or carbon dioxide ($CO_2$) evolution rate was charged with 184.9 g (2.1 moles) of solid ethylene carbonate. The vessel was purged with $N_2$ for 30 minutes and heat was then applied to melt the ethylene carbonate. As the ethylene carbonate began to melt (35 to 40° C.), the stirrer was turned on and the stirring speed gradually increased until the molten ethylene carbonate was at a temperature of 500° C. At this point, 110.1 g (1.0 mole) of solid resorcinol was added and stirred until a clear liquid was obtained. The temperature was adjusted to 65 to 75° C. and 0.15 g (0.00057 mole) of solid triphenylphosphine was added to the reaction flask. The temperature of the reaction mass was gradually raised to 165° C. and a steady flow of $CO_2$ was evolving. At this point, the $N_2$ sparge was discontinued. Throughout the entire reaction process, as well as cool down intervals, an inert atmosphere of either $CO_2$ and/or $N_2$ was maintained. The mixture was heated for a period of 20 hours at which point the evolution of $CO_2$ became slow and erratic. The $N_2$ sparge was restarted and the reaction mixture was cooled to 1 10° C. and 203.0 g of Terathanee® 2000 were added and stirred for an additional 30 minutes. The reaction mass was cooled to less than 100° C. giving a clear light yellow liquid. The yield was 409.5 g (101%) and the hydroxyl number was 300 (mg KOH/g sample) as compared to the calculated theoretical value of 304. Compositional analysis by proton NMR techniques showed the presence of a 50/50 weight ratio of aromatic/aliphatic diol.

Example 3

To a 500 ml resin kettle equipped with a stirrer, thermocouple well, nitrogen ($N_2$) inlet, heating mantle and reflux condenser attached to a bubbler to monitor $N_2$ and/or carbon dioxide ($CO_2$) evolution rate was charged with 220.2 g (2.5 moles) of solid ethylene carbonate. The vessel was purged with $N_2$ for 30 minutes and heat was then applied to melt the ethylene carbonate. As the ethylene carbonate began to melt (35 to 40° C.), the stirrer was turned on and the stirring speed gradually increased until the molten ethylene carbonate was at a temperature of 50° C. At this point, 110.1 g (1.0 mole) of solid resorcinol was added and stirred until a clear liquid was obtained. The temperature was adjusted to 65 to 75° C and 0.15 g (0.00057 mole) of solid triphenylphosphine was added to the reaction flask. The temperature of the reaction mass was gradually raised to 165° C. and a steady flow of $CO_2$ was evolving. At this point, the $N_2$ sparge was discontinued. Throughout the entire reaction process, as well as cool down intervals, an inert atmosphere of either $CO_2$ and/or $N_2$ was maintained. The mixture was heated for a period of 20 hours at which point the evolution of $CO_2$ became slow and erratic. The $N_2$ sparge was restarted and the reaction mixture as cooled to 110° C. and 442.0 g of Terathane® 1000 and 73.7 g of Terathane® 2000 were added and stirred for an additional 30 minutes. The reaction mass was cooled to less than 100° C. giving a clear light yellow liquid. The yield was 749.7 g (102%) and the hydroxyl number was 220 (mg KOH/g sample) as compared to the calculated theoretical value of 223. Compositional analysis by proton NMR techniques showed the presence of a 29/71 weight ratio of aromatic/aliphatic diol. The 71 weight percent of aliphatic diol was approximately 40% of a diol having a molecular weight of 1000 and approximately 30% of a diol having a molecular weight of 2000.

Example 4

To a 500 ml resin kettle equipped with a stirrer, thermocouple well, nitrogen ($N_2$) inlet, heating mantle and reflux condenser attached to a bubbler to monitor $N_2$ and/or carbon dioxide ($CO_2$) evolution rate was charged with 220.2 g (2.5 moles) of solid ethylene carbonate. The vessel was purged with $N_2$ for 30 minutes and heat was then applied to melt the ethylene carbonate. As the ethylene carbonate began to melt (35 to 40° C.), the stirrer was turned on and the stirring speed gradually increased until the molten ethylene carbonate was at a temperature of 50° C. At this point, 110.1 g (1.0 mole) of solid resorcinol was added and stirred until a clear liquid was obtained. The temperature was adjusted to 65 to 75° C. and 0.15 g (0.00057 mole) of solid triphenylphosphine was added to the reaction flask. The temperature of the reaction mass was gradually raised to 165° C. and a steady flow of $CO_2$ was evolving. At this point, the $N_2$ sparge was discontinued. Throughout the entire reaction process, as well as cool down intervals, an inert atmosphere of either $CO_2$ and/or $N_2$ was maintained. The mixture was heated for a period of 20 hours at which point the evolution of $CO_2$ became slow and erratic. The $N_2$ sparge was restarted and the reaction mixture was cooled to 110° C. and 294.7 g of Terathane® 1000 and 221.0 g of Terathane® 2000 were added and stirred for an additional 30 minutes. The reaction mass was cooled to less than 100° C. giving a clear light yellow liquid. The yield was 744.3 g (101%) and the hydroxyl number was 212 (mg KOH/g sample) as compared to the calculated theoretical value of 212. Compositional analysis by proton NMR techniques showed the presence of a 29/71 weight ratio of aromatic/aliphatic diol. The 71 weight percent of aliphatic diol was approximately 40% of a diol having a molecular weight of 1000 and approximately 30% of a diol having a molecular weight of 2000.

Example 5

To a 500 ml resin kettle equipped with a stirrer, thermocouple well, nitrogen ($N_2$) inlet, heating mantle and reflux condenser attached to a bubbler to monitor $N_2$ and/or carbon dioxide ($CO_2$) evolution rate was charged with 554.7 g (6.3 moles) of solid ethylene carbonate. The vessel was purged with $N_2$ for 30 minutes and heat was then applied to melt the ethylene carbonate. As the ethylene carbonate began to melt (35 to 40° C.), the stirrer was turned on and the stirring speed gradually increased until the molten ethylene carbonate was at a temperature of 50° C. At this point, 330.3 g (3.0 moles) of solid resorcinol was added and stirred until a clear liquid was obtained. The temperature was adjusted to 65 to 75° C. and 0.45 g (0.00171 mole) of solid triphenylphosphine was added to the reaction flask. The temperature of the reaction mass was gradually raised to 165° C. and a steady flow of $CO_2$ was evolving. At this point, the $N_2$ sparge was discontinued. Throughout the entire reaction process, as well as cool down intervals, an inert atmosphere of either $CO_2$ and/or $N_2$ was maintained. The mixture was heated for a period of 24.5 hours at which point the evolution of $CO_2$ became slow and erratic. The $N_2$ sparge was restarted and the reaction mixture was cooled to 110° C. and 261.0 g of Terathane® 2000 were added and stirred for an additional 30 minutes. The reaction mass was cooled to less than 100° C. giving a clear light yellow liquid. The yield was 875.4 g (101%) and the hydroxyl number was 410 (mg KOH/g sample) as compared to the calculated theoretical value of 402. Compositional analysis by proton NMR techniques showed the presence of a 71/29 weight ratio of aromatic/aliphatic diol.

Example 6

Aromatic diol/aliphatic diol blends were prepared according to the above examples using 2.1 mole ethylene carbonate to 1 mole resorcinol, and Terathane® having a molecular weight of either 1000 or 2000 in the ratios indicated in Table 1. The blends were measured for the temperature at which melting began (onset) and at which melting was complete (peak). Results are shown in Table 1.

Example 7

The various blends prepared as described in Example 6 were further blended with Baytec® ME-050, an MDI-polyether prepolymer having an NCO content of 5.8% commercially available from Bayer Corporation, to form polyurethane elastomers. The elastomers were evaluated for their physical and mechanical properties including:

1. Tensile Strength, % elongation and modulus (ASTM D 412);
2. Tear Strength, Die C (ASTM D 624);
3. Shore Hardness, Durometer A (ASTM D 40);
4. Bashore Rebound (ASTM D 2632); and
5. Compression Set % (ASTM D 395), Method B.

The results, presented in Table 2, show that different blends give different properties. This illustrates another advantage of the present invention, in that the user can select the ratio desired for a particular application. For example, the Bashore rebound values obtained with the 30/70 blends would be ideal for use with golf ball cores.

Example 8

The cast elastomers prepared according to Example 7 were tested for thermal stability as determined by DSC analysis, and for dynamic mechanical analysis (DMA). DMA was determined using Rheometrics, RMS-800 instrument at 1 Hz frequency with a heating rate of 2–10° C./min. DSC analysis, DSC thermograms, of the cast elastomers was measured on a Perkin Elmer (DSC-7) at a heating rate of 10° C./min under nitrogen atmosphere. The thermal stability results are given in Table 3. As illustrated in the table, the higher the molecular weight of the polyol, the higher the thermal stability of the cast elastomers.

The DMA results are given in Table 4. As can be seen in the table, the cast elastomers prepared with the blend of the present invention have a low loss compliance; materials made utilizing these elastomers would therefore deteriorate more slowly than would materials made with an elastomer having a high loss compliance. In comparing the loss compliance of different formulations, loss compliance and performance are proportional. This is true throughout the examples. Peak tan delta values are also very low, indicating less tendency for these materials to absorb mechanical energy.

Example 9

A performance comparison was conducted between cast polyurethanes prepared with Baytec® ME-050 and either butane diol, the aromatic diol portion of the present blends above, or the aromatic/aliphatic blends of the present invention. A thermal aging study was performed at 110° C. after 28 days and at 150° C. after 6 days. DMA and DSC analysis of unaged and heat aged elastomers were also performed. The results are provided in Tables 5 through 8. Table 5 in the "area under the J curve" section demonstrates the products prepared using the blends of the present invention were superior to those using a butane diol.

example, in comparing the "after" values of loss compliance at 250° C., the BD extended elastomer had a value of 16.6 while the elastomer made with a 90/10 blend of the present invention had a value of 5.7. Because performance is proportional to these values, performance of elastomers using this present blend is 16.6/5.7, or approximately three times better, than elastomers made with BD. These results are also demonstrated in Table 6. In addition, peak tan delta values for the current diol blend extended elastomers was lower than butane diol extended elastomers as seen in Tables 5 and 6.

Example 10

A hydrolysis resistance study was performed on cast elastomers prepared according Example 7 utilizing the diol blend of the present invention as compared with cast elastomers prepared with either butane diol or the aromatic portion of the present blends alone. Table 9 provides the affect of aromatic diol concentration on hydrolysis resistance, while Table 10 shows the affect of the polyol molecular weight. The data indicates that the system of the present invention is 10–12% better than when using butane diol.

Example 11

Example 7 was repeated using Vibrathane® B-625 instead of Baytec ME-050. Vibrathane® contains 6.5% NCO. The evaluation of the elastomers is provided in Table 11, the DSC analysis results in Table 12 and the DMA results in Table 13. As can be seen from the above tables, the superior cast elastomer properties can be achieved using prepolymers having various percents NCO content.

Example 12

Example 7 was repeated using Baytec® ME-080, a prepolymer containing 8.0% NCO. The evaluation results are provided in Table 14, the DSC analysis results in Table 15, and the DMA results in Table 16. In addition, a hydrolysis resistance study was performed according to the method of Example 10; results are shown in Table 17. As can be seen from these tables, high hardness elastomers having good tan strength, low compression set, high temperature with overall physical and mechanical properties achieved with these aromatic diol blends. Elastomers with these properties find application in the areas of, for example, recreational wheels, seals and golf balls.

Example 13

An aromatic diol/aliphatic diol blend was prepared according to the method of Example 6, but using 2.5 moles ethylene carbonate instead of 2.1 moles. The blend was used to prepare a cast elastomer with the Baytec® ME-050 prepolymer. The evaluation of the resulting cast polyurethane is provided in Table 18. As can be seen from that table, these blend materials appeared to be liquid at room temperature suggesting a wide range of applications. Table 19 provides results of the physical and mechanical properties evaluations of the elastomers. In addition, to excellent tensile strength properties, these blends provide highly resilient (Bashore rebound in excess of 70%) cast urethane elastomers suggesting an excellent chain extender for the development of golf ball cores.

The above examples clearly demonstrate that the diol blends of the present invention can be used to prepare cast polyurethanes having comparable if not superior properties to those known in the art. That the present diol blends can be processed in these applications at temperatures of approximately 70° C. or lower while still providing desired properties in the end product indicates the superiority of the present blends. Elastomers made using these blends have low hysteresis (tan delta) values, excellent rebound properties i.e., >70, good hydrolytic and thermal stability, low compression set and low glass transition temperature as determined by DMA.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

TABLE 1

MELTING BEHAVIOR OF AROMATIC/ALIPHATIC (MOLECULAR WEIGHT 1000 OR 2000) BLENDS
DSC ANALYSIS RESULTS

| SAMPLES | RATIO (WT.) | HIGHER ENDOTHERMIC PEAK | |
|---|---|---|---|
| | | ONSET TEMP (° C.) | PEAK TEMP (° C.) |
| AROMATIC | 100 | 84.1 | 89.8 |
| AROMATIC/ALIPHATIC (MW 1000) | 90/10 | 75.2 | 84.5 |
| AROMATIC/ALIPHATIC (MW 1000) | 70/30 | 69.9 | 84.3 |
| AROMATIC/ALIPHATIC (MW 1000) | 50/50 | 73.3 | 85.8 |
| AROMATIC/ALIPHATIC (MW 1000) | 30/70 | 65.6 | 80.7 |
| AROMATIC/ALIPHATIC (MW 2000) | 90/10 | 84.6 | 88.7 |
| AROMATIC/ALIPHATIC (MW 2000) | 70/30 | 81.2 | 87.3 |
| AROMATIC/ALIPHATIC (MW 2000) | 50/50 | 74.8 | 84.7 |
| AROMATIC/ALIPHATIC (MW 2000) | 30/70 | 74.6 | 81.7 |

TABLE 2

CAST ELASTOMERS BASED ON BAYTEC ME-050 AND AROMATIC/ALIPHATIC BLENDS

| ALIPHATIC MOLECULAR WEIGHT | 1000 | 1000 | 1000 | 1000 | 2000 | 2000 | 2000 | 2000 |
|---|---|---|---|---|---|---|---|---|
| AROMATIC/ALIPHATIC RATIO | 90/10 | 70/30 | 50/50 | 30/70 | 90/10 | 70/30 | 50/50 | 30/70 |
| CASTING CONDITIONS | | | | | | | | |
| PREPOLYMER TEMPERATURE, °C. | 85 | 85 | 85 | 85 | 85 | 85 | 85 | 85 |
| BLEND TEMPERATURE, °C. | 85 | 85 | 85 | 85 | 85 | 85 | 85 | 85 |
| MIX RATIO (PREPOLYMER/BLEND) | 100/14.7 | 100/17.8 | 100/22.5 | 100/30.5 | 100/14.9 | 100/18.5 | 100/24.5 | 100/36.4 |
| STOICHIOMETRY, % THEORY | 95 | 95 | 95 | 95 | 95 | 95 | 95 | 95 |
| CURE, HR/°C. | 16/110 | 16/110 | 16/110 | 16/110 | 16/110 | 16/110 | 16/110 | 16/110 |
| TENSILE PROPERTY | | | | | | | | |
| 100% MODULUS (PSI) | 1235 | 1144 | 914 | 728 | 1214 | 1151 | 1015 | 802 |
| 200% MODULUS (PSI) | 1656 | 1546 | 1285 | 1040 | 1650 | 1581 | 1434 | 1154 |
| 300% MODULUS (PSI) | 2143 | 2047 | 1797 | 1569 | 2152 | 2097 | 1982 | 1704 |
| TENSILE STRENGTH (PSI) | 3535 | 3730 | 3586 | 2726 | 3493 | 3702 | 3819 | 3957 |
| % ELONGATION | 546 | 519 | 480 | 407 | 544 | 532 | 504 | 467 |
| ENERGY TO BREAK (Lb-in) (AREA UNDER STRESS/STRAIN CURVE) | 435 | 396 | 328 | 202 | 466 | 452 | 392 | 295 |
| TEAR STRENGTH, DIE C (Lb-in) | 645 | 606 | 472 | 385 | 622 | 582 | 565 | 506 |
| COMPRESSION SET, % | 16.5 | 16.9 | 18.1 | 25.6 | 16.4 | 15 | 16.3 | 17.7 |
| BASHORE REBOUND, % | 63 | 66 | 69 | 72 | 65 | 67 | 67 | 72 |
| HARDNESS, SHORE-A | 92 | 90 | 87 | 81 | 93 | 92 | 90 | 85 |

| | | | | |
|---|---|---|---|---|
| ALIPHATIC MOLECULAR WEIGHT | 2900 | 2900 | 2900 | AROMATIC | BD |
| AROMATIC/ALIPHATIC RATIO | 90/10 | 70/30 | 50/50 | 100% | 100% |
| CASTING CONDITIONS | | | | | |
| PREPOLYMER TEMPERATURE, °C. | 85 | 85 | 85 | 85 | 85 |
| BLEND TEMPERATURE, °C. | 85 | 85 | 85 | 85 | RT |
| MIX RATIO (PREPOLYMER/BLEND) | 100/14.9 | 100/18.8 | 100/25.3 | 100/13.5 | 100/5.9 |
| STOICHIOMETRY, % THEORY | 95 | 95 | 95 | 95 | 95 |
| CURE, HR/°C. | 16/110 | 16/110 | 16/110 | 16/110 | 16/110 |
| TENSILE PROPERTY | | | | | |
| 100% MODULUS (PSI) | 1208 | 1144 | 1022 | 1267 | 909 |
| 200% MODULUS (PSI) | 1636 | 1569 | 1463 | 1721 | 1280 |
| 300% MODULUS (PSI) | 2133 | 2087 | 2043 | 2237 | 1850 |
| TENSILE STRENGTH (PSI) | 3719 | 3597 | 3864 | 3592 | 4453 |
| % ELONGATION | 558 | 530 | 504 | 541 | 456 |
| ENERGY TO BREAK (Lb-in) (AREA UNDER STRESS/STRAIN CURVE) | 488 | 445 | 399 | 481 | 301 |
| TEAR STRENGTH, DIE C (Lb-in) | 624 | 609 | 574 | 634 | 517 |
| COMPRESSION SET, % | 16.8 | 15.8 | 15.1 | 16.5 | 15.3 |
| BASHORE REBOUND, % | 64 | 67 | 67 | 64 | 67 |
| HARDNESS, SHORE-A | 92 | 92 | 90 | 94 | 88 |

TABLE 3

THERMAL STABILITY OF CAST ELASTOMERS FROM DSC ANALYSIS
BAYTEC ME-050-AROMATIC/ALIPHATIC BLENDS

| | FIRST HEATING ENDOTHERM | | COOLING DOWN EXOTHERM | | SECOND HEATING ENDOTHERM | |
|---|---|---|---|---|---|---|
| | PEAK (°C.) | ENERGY, J/g | PEAK (°C.) | ENERGY, J/g | PEAK (°C.) | ENERGY, J/g |
| 1,4-BUTANE DIOL (BD) | 180 | 14 | 102 | 1 | NONE | ND |
| AROMATIC (100%) | 189 | 18 | 103 | 11 | 191 | 5 |
| AROMATIC/ALIPHATIC-(MW 1000) (WT. RATIO) | | | | | | |
| (90/10) | 186 | 19 | 103 | 12 | 189 | 8 |
| (70/30) | 185 | 17 | 102 | 9 | 181 | 6 |
| (50/50) | 177, 186 | 16 | 80, 99 | 9 | 155, 173 | 8 |
| (30/70) | 177, 185 | 15 | 67 | 2 | 143, 167 | 7 |

TABLE 3-continued

THERMAL STABILITY OF CAST ELASTOMERS FROM DSC ANALYSIS
BAYTEC ME-050-AROMATIC/ALIPHATIC BLENDS

|  | FIRST HEATING ENDOTHERM | | COOLING DOWN EXOTHERM | | SECOND HEATING ENDOTHERM | |
|---|---|---|---|---|---|---|
|  | PEAK (° C.) | ENERGY, J/g | PEAK (° C.) | ENERGY, J/g | PEAK (° C.) | ENERGY, J/g |
| AROMATIC/ALIPHATIC-(MW 2000) (WT. RATIO) | | | | | | |
| (70/30) | 188 | 17 | 101 | 11 | 189 | 6 |
| (30/70) | 179, 190 | 14 | 76, 99 | 5 | 146, 173 | 8 |
| AROMATIC/ALIPHATIC-(MW 2900) (WT. RATIO) | | | | | | |
| (90/10) | 190 | 21 | 103 | 10 | 192 | 5 |
| (70/30) | 188 | 19 | 102 | 9 | 191 | 6 |

TABLE 4

DMA RESULTS OF CAST ELASTOMERS BASED ON BAYTEC
ME-050-AROMATIC/ALIPHATIC BLENDS

| ALIPHATIC MW | | | 1000 | 1000 | 2000 | 2000 | 2900 | 2900 |
|---|---|---|---|---|---|---|---|---|
| AROMATIC/ALIPHATIC BLENDS | BD = 100% | AROMATIC | 90/10 | 70/30 | 90/10 | 70/30 | 90/10 | 70/30 |
| STORAGE MODULUS, G' (Dynes/cm$^2$) | | 100% | | | | | | |
| AT 25° C. × 10$^8$ | 1.18 | 1.85 | 1.83 | 1.47 | 1.82 | 1.76 | 1.85 | 1.56 |
| AT 100° C. × 10$^8$ | 1.12 | 1.79 | 1.68 | 1.32 | 1.67 | 1.67 | 1.69 | 1.48 |
| AT 150° C. × 10$^8$ | 0.94 | 1.41 | 1.36 | 1.11 | 1.37 | 1.29 | 1.41 | 1.27 |
| THERMAL STABILITY (Temp. Max for Constant G') | | | | | | | | |
| TEMP. (° C.) | 165 | 165 | 160 | 160 | 160 | 160 | 160 | 160 |
| G', Dynes/cm$^2$ × 10$^8$ | 0.75 | 1.13 | 1.21 | 1.02 | 1.24 | 1.18 | 1.28 | 1.17 |
| LOSS MODULUS, G" (Dynes/cm$^2$) | | | | | | | | |
| PEAK TEMP., Tg (° C.) | −69.3 | −69.8 | −69.3 | −69.7 | −69.2 | −70 | −69.8 | 69.3 |
| PEAK MODULUS, × 10$^8$ | 9.82 | 5.97 | 9.18 | 9.01 | 8.69 | 9.23 | 9.32 | 7.9 |
| AT 25° C. × 10$^7$ | 0.29 | 0.62 | 0.58 | 0.4 | 0.54 | 0.49 | 0.57 | 0.45 |
| AT 100° C. × 10$^7$ | 0.18 | 0.31 | 0.2 | 0.21 | 0.25 | 0.22 | 0.26 | 0.27 |
| AT 150° C. × 10$^7$ | 0.19 | 0.31 | 0.25 | 0.19 | 0.24 | 0.22 | 0.25 | 0.25 |
| TAN DELTA | | | | | | | | |
| PEAK TEMP., Tg (° C.) | −57.5 | −59.9 | −59.5 | −55.6 | −59.1 | −59.8 | −59.6 | −59.6 |
| PEAK TAN DELTA | 0.5 | 0.34 | 0.37 | 0.42 | 0.3 | 0.4 | 0.37 | 0.37 |
| AT 25° C. | 0.025 | 0.034 | 0.032 | 0.027 | 0.029 | 0.027 | 0.03 | 0.03 |
| AT 100° C. | 0.016 | 0.017 | 0.012 | 0.016 | 0.014 | 0.013 | 0.015 | 0.018 |
| AT 150° C. | 0.02 | 0.022 | 0.018 | 0.017 | 0.017 | 0.017 | 0.018 | 0.019 |
| LOSS COMPLIANCE, J" (cm$^2$/Dynes) | | | | | | | | |
| PEAK TEMP. ° C. | −49.7 | −53.7 | −51.7 | −49.3 | −49.5 | −54 | −51.8 | −51.4 |
| PEAK COMPLIANCE, × 10$^{-10}$ | 10.4 | 4.16 | 4.23 | 6.67 | 2.53 | 4.78 | 4.22 | 4.75 |
| AT 25° C., × 10$^{-10}$ | 2.1 | 1.81 | 1.75 | 1.87 | 1.63 | 1.57 | 1.65 | 1.87 |
| AT 100° C., × 10$^{-10}$ | 1.4 | 0.96 | 0.72 | 1.19 | 0.88 | 0.78 | 0.94 | 1.23 |
| AT 150° C., × 10$^{-10}$ | 2.12 | 1.53 | 1.33 | 1.55 | 1.26 | 1.33 | 1.27 | 1.55 |

TABLE 5

DMA RESULTS OF 110 C./28 DAYS HEAT AGED ELASTOMERS
BAYTEC ME-050 - AROMATIC/ALIPHATIC - 2000 BLENDS

| AROMATIC/ALIPHATIC (MW 2000) BLENDS BD = 100% | AROMATIC= 100% | | 90/10 | | 90/10 | |
|---|---|---|---|---|---|---|
| STORAGE MODULUS, G' (Dynes/cm$^2$) | BEFORE | AFTER | BEFORE | AFTER | BEFORE | AFTER |
| AT 25° C. × 10$^8$ | 1.18 | 0.61 | 1.85 | 1.31 | 1.82 | 1.16 |
| AT 100° C. × 10$^8$ | 1.12 | 0.24 | 1.79 | 0.66 | 1.67 | 0.56 |
| AT 150° C. × 10$^8$ | 0.94 | 0.08 | 1.41 | 0.23 | 1.37 | ND |
| THERMAL STABILITY (Temp. Max for Constant G') | | | | | | |
| TEMP. (° C.) | 165 | 130 | 165 | 130 | 160 | 125 |
| G', Dynes/cm$^2$ × 10$^8$ | 0.75 | 0.17 | 1.13 | 0.48 | 1.24 | 0.43 |
| Tg (° C.) | | | | | | |
| G" PEAK TEMP. | −69.3 | −65.5 | −69.8 | −67.7 | −69.2 | −65.6 |
| TAN DELTA PEAK TEMP. | −57.5 | −57.6 | 59.9 | −35.6 | −59.1 | −33.5 |
| TAN DELTA | | | | | | |
| AT 25° C. | 0.025 | 0.103 | 0.034 | 0.074 | 0.029 | 0.067 |
| AT 100° C. | 0.016 | 0.119 | 0.017 | 0.076 | 0.014 | 0.079 |
| AT 150° C. | 0.02 | 0.154 | 0.022 | 0.114 | 0.017 | ND |
| LOSS COMPLIANCE, J" (cm$^2$/Dynes) | | | | | | |
| AT 25° C., × 10$^{-10}$ | 2.1 | 16.6 | 1.81 | 5.6 | 1.63 | 5.7 |
| AT 100° C., × 10$^{-10}$ | 1.4 | 49.3 | 0.96 | 11.3 | 0.88 | 13.9 |
| AT 150° C., ° × 10$^{-10}$ | 2.12 | 184.4 | 1.53 | 50 | 1.26 | ND |
| AREA UNDER THE J" CURVE | | | | | | |
| TEMP.: −90 T0 +110 C | 5.47 | 31.6 | 3.44 | 8.74 | 2.88 | 9.7 |

| AROMATIC/ALIPHATIC (MW 2000) BLENDS BD = 100% | 70/30 | | 50/50 | | 30/70 | |
|---|---|---|---|---|---|---|
| STORAGE MODULUS, G' (Dynes/cm$^2$) | BEFORE | AFTER | BEFORE | AFTER | BEFORE | AFTER |
| AT 25° C. × 10$^8$ | 1.76 | 1.1 | 1.34 | 0.74 | 0.79 | 0.39 |
| AT 100° C. × 10$^8$ | 1.67 | 0.55 | 1.29 | 0.32 | 0.76 | 0.11 |
| AT 150° C. × 10$^8$ | 1.29 | 0.18 | 1.03 | ND | 0.62 | ND |
| THERMAL STABILITY (Temp. Max for Constant G') | | | | | | |
| TEMP. (° C.) | 160 | 125 | 165 | 125 | 165 | 115 |
| G', Dynes/cm$^2$ × 10$^8$ | 1.18 | 0.44 | 0.78 | 0.25 | 0.49 | 0.08 |
| Tg (° C.) | | | | | | |
| G" PEAK TEMP. | −70 | −67.7 | −71.3 | −67.7 | −69 | −61.7 |
| TAN DELTA PEAK TEMP. | −59.8 | −31.6 | −59.6 | −47.7 | −57.3 | −28.3 |
| TAN DELTA | | | | | | |
| AT 25° C. | 0.027 | 0.07 | 0.022 | 0.077 | 0.016 | 0.072 |
| AT 100° C. | 0.013 | 0.077 | 0.015 | 0.085 | 0.014 | 0.082 |
| AT 150° C. | 0.017 | 0.123 | 0.022 | ND | 0.027 | ND |
| LOSS COMPLIANCE, J" (cm$^2$/Dynes) | | | | | | |
| AT 25° C., × 10$^{-10}$ | 1.57 | 6.3 | 1.66 | 10.3 | 1.98 | 18.4 |
| AT 100° C., × 10$^{-10}$ | 0.78 | 13.9 | 1.13 | 26.5 | 1.87 | 72 |
| AT 150° C., ° × 10$^{-10}$ | 1.33 | 67.1 | 2.18 | ND | 4.5 | ND |
| AREA UNDER THE J" CURVE | | | | | | |
| TEMP.: −90 T0 +110 C | 3.24 | 10.5 | 3.96 | 17.4 | 7.12 | 40.2 |

TABLE 6

DMA RESULTS OF 150 C./6 DAYS HEAT AGED ELASTOMERS FROM
BAYTEC ME-050 - AROMATIC/ALIPHATIC - 2000 BLENDS

| AROMATIC/ ALIPHATIC (MW 2000) BLENDS | BD = 100% | | Aromatic = 100% | | 90/10 | | 90/10 | | 70/30 | | 70/30 | | 50/50 | | 50/50/ | | 30/70 | | 30/70 | |
|---|---|---|---|---|---|---|---|---|---|---|---|---|---|---|---|---|---|---|---|---|
| STORAGE MODULUS, G' (Dynes/cm$^2$) | Before | After | Before | After | Before | After | Before | After | Before | After | Before | After | Before | After | Before | After | Before | After | Before | After |
| AT 25° C. × 10$^8$ | 1.18 | 0.57 | 1.85 | 0.91 | 1.82 | 0.82 | 1.76 | 0.81 | 1.34 | 0.61 | 0.79 | 0.41 | | | | | | | | |
| AT 100° C. × 10$^8$ | 1.12 | 0.21 | 1.79 | 0.3 | 1.67 | 0.26 | 1.67 | 0.27 | 1.29 | 0.18 | 0.76 | 0.11 | | | | | | | | |
| AT 150° C. × 10$^8$ | 0.94 | 0.15 | 1.41 | 0.2 | 1.37 | 0.19 | 1.29 | 0.18 | 1.03 | 0.11 | 0.62 | ND | | | | | | | | |
| THERMAL STABILITY (Temp. Max for Constant G') | | | | | | | | | | | | | | | | | | | | |
| TEMP. (° C.) | 165 | ND | 165 | ND | 160 | ND | 160 | ND | 165 | ND | 165 | ND | | | | | | | | |
| G', Dynes/cm$^2$ × 10$^8$ | 0.75 | ND | 1.13 | ND | 1.24 | ND | 1.18 | ND | 0.78 | ND | 0.49 | ND | | | | | | | | |
| LOSS MODULUS, G" (Dynes/cm$^2$) | | | | | | | | | | | | | | | | | | | | |
| PEAK TEMP., Tg(° C.) | −69.3 | −64.1 | −69.8 | −63.7 | −69.2 | −58.9 | −70 | −63.5 | −71.3 | −65.9 | −69 | −63 | | | | | | | | |
| TAN DELTA | | | | | | | | | | | | | | | | | | | | |
| PEAK TEMP., Tg (° C.) | −57.5 | −33.7 | −59.9 | −47.6 | −59.1 | −39.1 | −59.8 | −47.9 | −59.6 | −49.5 | −57.3 | −33.3 | | | | | | | | |
| PEAK TAN DELTA | 0.5 | 0.259 | 0.34 | 0.27 | 0.3 | 0.216 | 0.4 | 0.265 | 0.47 | 0.324 | 0.59 | 0.23 | | | | | | | | |
| AT 25° C. | 0.025 | 0.165 | 0.034 | 0.116 | 0.029 | 0.127 | 0.027 | 0.123 | 0.022 | 0.113 | 0.016 | 0.119 | | | | | | | | |
| AT 100° C. | 0.016 | 0.145 | 0.017 | 0.109 | 0.014 | 0.104 | 0.013 | 0.123 | 0.015 | 0.113 | 0.014 | 0.139 | | | | | | | | |
| AT 150° C. | 0.02 | 0.162 | 0.022 | 0.103 | 0.017 | 0.094 | 0.017 | 0.128 | 0.022 | 0.12 | 0.027 | ND | | | | | | | | |
| LOSS COMPLIANCE, J" (cm$^2$/Dynes) | | | | | | | | | | | | | | | | | | | | |
| PEAK TEMP. ° C. | −49.7 | 20.8 | −53.7 | 20.3 | −49.5 | 22 | −54 | 21 | −53.4 | 18.9 | −49.5 | 20.7 | | | | | | | | |
| PEAK COMPLIANCE, × 10$^{-10}$ | 10.4 | 27.6 | 4.16 | 12.8 | 2.53 | 15 | 4.78 | 15.5 | 7.57 | 17.5 | 1.83 | 28.8 | | | | | | | | |
| AT 25° C., × 10$^{-10}$ | 2.1 | 28.2 | 1.81 | 12.6 | 1.63 | 15.3 | 1.57 | 15 | 1.66 | 18.2 | 1.98 | 28.6 | | | | | | | | |
| AT 100° C., × 10$^{-10}$ | 1.4 | 66.6 | 0.96 | 36.2 | 0.88 | 39.6 | 0.78 | 45.3 | 1.13 | 62.9 | 1.87 | 128 | | | | | | | | |
| AT 150° C., × 10$^{-10}$ | 2.12 | 107.6 | 1.53 | 51.5 | 1.26 | 49.8 | 1.33 | 69.7 | 2.18 | 112.2 | 4.5 | ND | | | | | | | | |

TABLE 7

THERMAL STABILITY OF 110 C./28 DAYS HEAT AGED ELASTOMERS FROM
BAYTEC ME-050 - AROMATIC/ALIPHATIC BLENDS
DSC ANALYSIS RESULTS

| CHAIN EXTENDERS | | FIRST HEATING ENDOTHERM | | COOLING DOWN EXOTHERM | | SECOND HEATING ENDOTHERM | |
|---|---|---|---|---|---|---|---|
| | | PEAK (° C.) | ENERGY, J/g | PEAK (° C.) | ENERGY, J/g | PEAK (° C.) | ENERGY, J/g |
| 1,4-BUTANE DIOL (BD) | BEFORE | 180 | 14 | 102 | 1 | NONE | ND 2 |
| | AFTER | 179, 196 | 12 | 102 | 2 | 194 | |
| AROMATIC (100%) | BEFORE | 189 | 18 | 103 | 11 | 191 | 5 |
| | AFTER | 175, 184 | 21 | 101 | 11 | 179 | 10 |
| AROMATIC/ALIPHATIC - (MW 1000) (WT. RATIO) | | | | | | | |
| (70/30) | BEFORE | 185 | 17 | 102 | 9 | 181 | 6 |
| | AFTER | 183, 192 | 16 | 85, 99 | 7 | 173 | 5 |
| AROMATIC/ALIPHATIC (MW 2000) (WT. RATIO) | | | | | | | |
| (90/10) | BEFORE | | | | | | |
| | AFTER | 183 | 17 | 100 | 8 | 173 | 9 |
| (70/30) | BEFORE | 188 | 17 | 101 | 11 | 189 | 6 |
| | AFTER | 172, 184 | 21 | 100 | 7 | 173 | 7 |
| (50/50) | BEFORE | | | | | | |
| | AFTER | 171, 189 | 14 | 97 | 6 | 170 | 4 |
| (30/70) | BEFORE | 179, 190 | 14 | 76, 99 | 5 | 146, 173 | 8 |
| | AFTER | 181 | 19 | 73, 91 | 6 | 167 | 4 |

TABLE 7-continued

THERMAL STABILITY OF 110 C./28 DAYS HEAT AGED ELASTOMERS FROM
BAYTEC ME-050 - AROMATIC/ALIPHATIC BLENDS
DSC ANALYSIS RESULTS

| CHAIN EXTENDERS | | FIRST HEATING ENDOTHERM | | COOLING DOWN EXOTHERM | | SECOND HEATING ENDOTHERM | |
|---|---|---|---|---|---|---|---|
| | | PEAK (° C.) | ENERGY, J/g | PEAK (° C.) | ENERGY, J/g | PEAK (° C.) | ENERGY, J/g |
| AROMATIC/ALIPHATIC - (MW 2900) (WT. RATIO) | | | | | | | |
| (70/30) | BEFORE | 188 | 19 | 102 | 9 | 191 | 6 |
| | AFTER | 170,185 | 15 | 100 | 8 | 173 | 8 |

TABLE 8

THERMAL STABILITY OF 150 C./28 DAYS HEAT AGED ELASTOMERS FROM
BAYTEC ME-050 - AROMATIC/ALIPHATIC BLENDS
DSC ANALYSIS RESULTS

| EXTENDER | | FIRST HEATING ENDOTHERM | | COOLING DOWN EXOTHERM | | SECOND HEATING ENDOTHERM | |
|---|---|---|---|---|---|---|---|
| | | PEAK (° C.) | ENERGY, J/g | PEAK (° C.) | ENERGY, J/g | PEAK (° C.) | ENERGY, J/g |
| 1,4-BUTANE DIOL (BD) | BEFORE | 180 | 14 | 102 | 1 | NONE | ND |
| | AFTER | 192 | 7 | 98 | 1 | 194 | 1 |
| AROMATIC (100%) | BEFORE | 189 | 18 | 103 | 11 | 191 | 5 |
| | AFTER | 183 | 16 | 101 | 8 | 181 | 6 |
| AROMATIC/ALIPHATIC - (MW 1000) (WT. RATIO) | | | | | | | |
| (70/30) | BEFORE | 185 | 17 | 102 | 9 | 181 | 6 |
| | AFTER | 186 | 12 | 98 | 7 | 178 | 7 |
| AROMATIC/ALIPHATIC - (MW 2000) (WT. RATIO) | | | | | | | |
| (70/30) | BEFORE | 188 | 17 | 101 | 11 | 189 | 6 |
| | AFTER | 184 | 14 | 100 | 6 | 178 | 5 |
| AROMATIC/ALIPHATIC - (MW 2900) (WT. RATIO) | | | | | | | |
| (70/30) | BEFORE | 188 | 19 | 102 | 9 | 191 | 6 |
| | AFTER | 187 | 10 | 101 | 6 | 181 | 7 |

ANALYSIS
BEFORE = BEFORE HEAT AGEING
AFTER = AFTER HEAT AGEING
SAMPLES WERE CONDITIONED FOR 1 WEEK AT 50% RELATIVE HUMIDITY AT ROOM TEMPERATURE BEFORE THE ANALYSIS.

TABLE 9

HYDROLYSIS RESISTANCE OF CAST ELASTOMERS FROM BAYTEC ME-050 -
AROMATIC/ALIPHATIC BLENDS
EFFECT OF AROMATIC CONCENTRATION

| ALIPHATIC MOL. WT. | | | | | 2000 | 2000 |
|---|---|---|---|---|---|---|
| AROMATIC/ALIPRATIC BLENDS | BD 100% | BD 100% | AROMATIC 100% | AROMATIC 100% | 90/10 | 90/10 |
| WATER BOIL TENSILE PROPERTY | BEFORE | AFTER | BEFORE | AFTER | BEFORE | AFTER |
| 100% MODULUS (PSI) | 909 | 679(75) | 1267 | 1085(86) | 1214 | 1041(86) |
| 200% MODULUS (PSI) | 1280 | 1005(79) | 1721 | 1479(86) | 1650 | 1436(87) |
| 300% MODULUS (PSI) | 1850 | 1420(77) | 2237 | 1889(84) | 2152 | 1852(86) |
| TENSILE STRENGTH (PSI) | 4453 | 3374(76) | 3592 | 3115(87) | 3493 | 3020(86) |

TABLE 9-continued

HYDROLYSIS RESISTANCE OF CAST ELASTOMERS FROM BAYTEC ME-050 -
AROMATIC/ALIPHATIC BLENDS
EFFECT OF AROMATIC CONCENTRATION

| % ELONGATION | 456 | 510 | 541 | 635 | 544 | 611 |
|---|---|---|---|---|---|---|
| ENERGY TO BREAK (Lb-in) STRESS STRAIN CURVE AREA) | 301 | 283 | 481 | 508 | 466 | 479 |
| HARDNESS, SHORE-A | 88 | 83 | 94 | 90 | 93 | 90 |
| ALIPHATIC MOL. WT. | 2000 | 2000 | 2000 | 2000 | 2000 | 2000 |
| AROMATIC/ALIPRATIC BLENDS | 70/30 | 70/30 | 50/50 | 50/50 | 30/70 | 30/70 |

| WATER BOIL TENSILE PROPERTY | BEFORE | AFTER | BEFORE | AFTER | BEFORE | AFTER |
|---|---|---|---|---|---|---|
| 100% MODULUS (PSI) | 1151 | 973(85) | 1015 | 834(82) | 802 | 631(79) |
| 200% MODULUS (PSI) | 1581 | 1353(86) | 1434 | 1193(83) | 1154 | 938(81) |
| 300% MODULUS (PSI) | 2097 | 1766(84) | 1982 | 1618(82) | 1704 | 1356(82) |
| TENSILE STRENGTH (PSI) | 3702 | 3187(86) | 3819 | 3452(90) | 3957 | 3528(89) |
| % ELONGATION | 532 | 629 | 504 | 615 | 467 | 572 |
| ENERGY TO BREAK (Lb-in) STRESS STRAIN CURVE AREA) | 452 | 489 | 392 | 454 | 295 | 333 |
| HARDNESS, SHORE-A | 92 | 90 | 90 | 86 | 85 | 80 |

CONDITIONS: TEMPERATURE = 80° C. TIME = 2 WEEKS.
NOTE: VALUES IN THE PARENTHESES ARE THE PERCENT AGE OF PROPERTY RETAINED AFTER THE WATER IMMERSION AT 80° C. FOR TWO WEEKS.

TABLE 10

HYDROLYSIS RESISTANCE OF CAST ELASTOMERS FROM BAYTEC ME-050 -
AROMATIC/ALIPHATIC BLENDS
EFFECT OF ALIPHATIC MOLECULAR WEIGHT

| | | | | | ALIPHATIC MOL. WT. | | | | | |
|---|---|---|---|---|---|---|---|---|---|---|
| | | | | | 1000 | 1000 | 2000 | 2000 | 2900 | 2900 |
| | | | | | AROMATIC/ALIPHATIC BLENDS | | | | | |
| | BD 100% | BD 100% | AROMATIC 100% | AROMATIC 100% | 70/30 | 70/30 | 70/30 | 70/30 | 70/30 | 70/30 |
| WATER BOIL TENSILE PROPERTY | BEFORE | AFTER | BEFORE | AFTER | BEFORE | AFTER | BEFORE | AFTER | BEFORE | AFTER |
| 100% MODULUS (PSI) | 909 | 679(75) | 1267 | 1085(86) | 1144 | 929(81) | 1151 | 973(85) | 1144 | 970(85) |
| 200% MODULUS (PSI) | 1280 | 1005(79) | 1721 | 1479(86) | 1546 | 1306(84) | 1581 | 1353(86) | 1569 | 1351(86) |
| 300% MODULUS (PSI) | 1850 | 1420(77) | 2237 | 1889(84) | 2047 | 1720(84) | 2097 | 1766(84) | 2087 | 1763(84) |
| TENSILE STRENGTH (PSI) | 4453 | 3374(76) | 3592 | 3115(87) | 3730 | 3447(92) | 3702 | 3187(86) | 3597 | 3161(88) |
| % ELONGATION | 456 | 510 | 541 | 635 | 519 | 605 | 532 | 629 | 530 | 628 |
| ENERGY TO BREAK (Lb-in) (STRESS-STRAIN CURVE AREA) | 301 | 283 | 481 | 508 | 396 | 421 | 452 | 489 | 445 | 448 |
| HARDNESS, SHORE-A | 88 | 83 | 94 | 90 | 90 | 89 | 92 | 90 | 92 | 90 |

CONDITIONS: TEMPERATURE = 80° C. TIME = 2 WEEKS.
NOTE: VALUES IN THE PARENTHESES ARE THE PERCENT AGE OF PROPERTY RETAINED AFTER THE WATER IMMERSION AT 80° C. FOR TWO WEEKS.

TABLE 11

CAST POLYURETHANES FROM VIBRATHANE B-625 PREPOLYMER AND
AROMATIC/ALIPHATIC BLENDS

| AROMATIC/ALIPHATIC-(MW 1000)/ALIPHATIC-(MW 2000) (WEIGHT RATIO) | 100/0/0 | 70/30/0 | 70/0/30 |
|---|---|---|---|
| CASTING CONDITIONS | | | |
| PREPOLYMER TEMPERATURE, ° C. | 90 | 85 | 85 |
| BLEND TEMPERATURE, ° C. | 90 | 85 | 85 |

TABLE 11-continued

CAST POLYURETHANES FROM VIBRATHANE B-625 PREPOLYMER AND AROMATIC/ALIPHATIC BLENDS

| AROMATIC/ALIPHATIC-(MW 1000)/ALIPHATIC-(MW 2000) (WEIGHT RATIO) | 100/0/0 | 70/30/0 | 70/0/30 |
|---|---|---|---|
| MIX RATIO (PREPOLYMER/BLEND) | 100/14.9 | 100/19.6 | 100/20.4 |
| STOICHIOMETRY, % THEORY | 95 | 95 | 95 |
| CURE, HR/° C. | 16/110 | 16/110 | 16/110 |
| TENSILE PROPERTY | | | |
| 100% MODULUS (PSI) | 1554 | 1230 | 1306 |
| 200% MODULUS (PSI) | 2113 | 1673 | 1773 |
| 300% MODULUS (PSI) | 2767 | 2255 | 2336 |
| TENSILE STRENGTH (PSI) | 3937 | 3635 | 3497 |
| % ELONGATION | 476 | 461 | 461 |
| ENERGY TO BREAK (Lb-in) (AREA UNDER STRESS-STRAIN CURVE) | ND | 321 | 308 |
| TEAR STRENGTH, DIE C (Lb/in) | 584 | 538 | 590 |
| COMPRESSION SET, % | 17.4 | 19.5 | 16.6 |
| BASHORE REBOUND, % | 60 | 59 | 61 |
| HARDNESS, SHORE-A (D) | 95 (48) | 92 (45) | 94 (46) |
| TABER ABRASION (mg) (H-18 WHEEL & 1000 g LOAD) | ND | 44 | 44 |

TABLE 12

THERMAL STABILITY OF CAST POLYURETHANES FROM VIBRATHANE B-625 AND AROMATIC/ALIPHATIC BLENDS DSC ANALYSIS RESULTS

| CHAIN EXTENDER | FIRST HEATING ENDOTHERM | | COOLING DOWN EXOTHERM | | SECOND HEATING ENDOTHERM | |
|---|---|---|---|---|---|---|
| | PEAK (° C.) | ENERGY, J/g | PEAK (° C.) | ENERGY, J/g | PEAK (° C.) | ENERGY, J/g |
| AROMATIC (100%) | 195 | 19 | 92 | 12 | 192 | 16 |
| AROMATIC/ALIPHATIC - (MW 1000) (WT. RATIO) (70/30) | 180,191 | 20 | 99 | 9 | 185 | 13 |
| AROMATIC/ALIPHATIC - (MW 2000) (WT. RATIO) (70/30) | 182,194 | 22 | 99 | 10 | 185 | 12 |

TABLE 13

DMA RESULTS OF CAST ELASTOMERS FROM VIBRATHANE B-625 AND AROMATIC/ALIPHATIC BLENDS

| ALIPHATIC MOL. WT. | | 1000 | 2000 |
|---|---|---|---|
| AROMATIC/ALIPHATIC BLENDS | AROMATIC = 100% | 70/30 | 70/30 |
| STORAGE MODULUS. G' (Dynes/cm$^2$) | | | |
| AT 25° C. × 10$^8$ | 2.8 | 1.74 | 2.01 |
| AT 100° C. × 10$^8$ | 2.4 | 1.5 | 1.87 |
| AT 150° C. × 10$^8$ | 1.9 | 1.32 | 1.47 |
| THERMAL STABILITY (Temp. Max for Constant G') | | | |
| TEMP. (° C.) | 160 | 165 | 165 |
| G', Dynes/cm$^2$ × 10$^8$ | 1.74 | 1.07 | 1.13 |
| LOSS MODULUS, G" (Dynes/cm$^2$) | | | |
| PEAK TEMP., Tg (° C.) | −68.8 | −66.9 | −72 |
| TAN DELTA | | | |
| PEAK TEMP., Tg (° C.) | −59.2 | −53.2 | −59.8 |
| PEAK TAN DELTA | 0.251 | 0.346 | 0.36 |
| AT 25° C. | 0.038 | 0.031 | 0.033 |
| AT 100° C. | 0.014 | 0.014 | 0.012 |
| AT 150° C. | 0.016 | 0.015 | 0.018 |
| AT 10 Hz/23° C. (Frequency) | 0.042 | 0.04 | 0.04 |
| LOSS COMPLIANCE, J" (cm$^2$/Dynes) | | | |
| PEAK TEMP. ° C. | 0.5; −49.4 | −43.3 | −51.7 |
| PEAK COMPLIANCE, × 10$^{-10}$ | 1.8;1.6 | 4.68 | 3.97 |
| AT 25° C., × 10$^{-10}$ | 1.4 | 1.78 | 1.64 |
| AT 100° C., × 10$^{-10}$ | 0.57 | 0.95 | 0.62 |
| AT 150° C., × 10$^{-10}$ | 0.8 | 1.18 | 1.26 |

TABLE 14

CAST ELASTOMERS BASED ON BAYTEC ME-080 AND AROMATIC/ALIPHATIC BLENDS

| AROMATIC/ALIPHATIC (MW 1000)/ALIPHATIC (MW 2000) BLENDS (WEIGHT RATIO) | BD | 100/0/0 | 70/30/0 | 70/0/30 |
|---|---|---|---|---|
| CASTING CONDITIONS | | | | |
| PREPOLYMER TEMPERATURE, °C. | 68 | 85 | 85 | 85 |
| BLEND TEMPERATURE, °C. | RT | 85 | 85 | 85 |
| MIX RATIO (PREPOLYMER/BLEND) | 100/8.4 | 100/19.1 | 100/25.1 | 100/26.2 |
| STOICHIOMETRY, % THEORY | 95 | 95 | 95 | 95 |
| CURE, HR/°C. | 16/110 | 16/110 | 16/110 | 16/110 |
| TENSILE PROPERTY | | | | |
| 100% MODULUS (PSI) | 1173 | 1839 | 1549 | 1612 |
| 200% MODULUS (PSI) | 1605 | 2269 | 1960 | 2002 |
| 300% MODULUS (PSI) | 2195 | 2703 | 2403 | 2408 |
| TENSILE STRENGTH (PSI) | 4647 | 3257 | 3368 | 3223 |
| % ELONGATION | 484 | 495 | 530 | 539 |
| ENERGY TO BREAK (Lb-in) (AREA UNDER STRESS-STRAIN CURVE) | 357 | 420 | 411 | 422 |
| TEAR STRENGTH, DIE C (Lb/in) | 619 | 776 | 698 | 715 |
| COMPRESSION SET, % | 20.7 | 17.6 | 19.1 | 18.1 |
| BASHORE REBOUND, % | 60 | 53 | 56 | 55 |
| HARDNESS, SHORE - A (D) | 93(47) | 97(52) | 96(51) | 96(50) |
| TABER ABRASION (mg) (H-18 WHEEL & 1000 g LOAD) | 12 | 57 | 41 | 46 |

TABLE 15

THERMAL STABILITY OF CAST ELASTOMERS FROM BAYTEC ME-080 AND AROMATIC/ALIPHATIC BLENDS
DSC ANALYSIS RESULTS

| CHAIN EXTENDER | FIRST HEATING ENDOTHERM | | COOLING DOWN EXOTHERM | | SECOND HEATING ENDOTHERM | |
|---|---|---|---|---|---|---|
| | PEAK (°C.) | ENERGY, J/g | PEAK (°C.) | ENERGY, J/g | PEAK (°C.) | ENERGY, J/g |
| AROMATIC (100%) | 196 | 28 | 105 | 15 | 190 | 17 |
| 1,4-BUTANEDIOL | 177 | 11 | BROAD 149 | 4 | BROAD 204, 207 | 7 |
| AROMATIC/ALIPHATIC-(MW 1000) (WT. RATIO) (70/30) | 179, 191 | 28 | 104 | 13 | 187 | 13 |
| AROMATIC/ALIPHATIC-(MW 2000) (WT. RATIO) (70/30) | 182, 194 | 30 | 105 | 14 | 190 | 17 |

TABLE 16

DMA RESULTS OF ELASTOMERS FROM BAYTEC ME-080-AROMATIC/ALIPHATIC BLENDS
BLENDS

| ALIPHATIC MOLECULAR WEIGHT AROMATIC/ALIPHATIC BLENDS | BD = 100% | AROMATIC = 100% | 1000 70/30 | 2000 70/30 |
|---|---|---|---|---|
| STORAGE MODULUS, G' | | | | |
| AT 25° C. × 10$^8$ | 1.94 | 4.75 | 2.99 | 3.07 |
| AT 100° C. × 10$^8$ | 1.51 | 3.57 | 2.42 | 2.47 |
| AT 150° C. × 10$^8$ | 1.24 | 2.93 | 2.06 | 2.01 |
| THERMAL STABILITY (Temp. Max for Constant G') | | | | |
| TEMP. (°C.) | 155 | 165 | 165 | 165 |
| G', Dynes/cm$^2$ × 10$^8$ | 1.09 | 2.37 | 1.62 | 1.66 |

TABLE 16-continued

DMA RESULTS OF ELASTOMERS FROM BAYTEC ME-080-
AROMATIC/ALIPHATIC BLENDS
BLENDS

| ALIPHATIC MOLECULAR WEIGHT<br>AROMATIC/ALIPHATIC BLENDS | BD = 100% | AROMATIC = 100% | 1000<br>70/30 | 2000<br>70/30 |
|---|---|---|---|---|
| LOSS MODULUS, G" (Dynes/cm$^2$) | | | | |
| PEAK TEMP., Tg (° C.) | −67.4 | −68.9 | −67 | −69.3 |
| TAN DELTA | | | | |
| PEAK TEMP., Tg (° C.) | −55.8 | −61.8 | −57.8 | −61.6 |
| PEAK TAN DELTA | 0.349 | 0.221 | 0.263 | 0.281 |
| AT 25° C. | 0.042 | 0.046 | 0.042 | 0.041 |
| AT 100° C. | 0.019 | 0.018 | 0.017 | 0.016 |
| AT 150° C. | 0.026 | 0.019 | 0.018 | 0.02 |
| LOSS COMPLIANCE, J" (cm$^2$/Dynes) | | | | |
| PEAK TEMP. ° C. | −47.7 | −52 | −46.2 | −53.8 |
| PEAK COMPLIANCE, × 10$^{-10}$ | 3.7 | 0.86 | 1.76 | 1.88 |
| AT 25° C., × 10$^{-10}$ | 2.15 | 1.04 | 1.43 | 1.35 |
| AT 100° C., × 10$^{-10}$ | 1.2 | 0.51 | 0.72 | 0.64 |
| AT 150° C., × 10$^{-10}$ | 2.12 | 0.64 | 0.87 | 1.01 |

TABLE 17

HYDROLYSIS RESISTANCE OF CAST ELASTOMERS FROM BAYTEC ME-080
AND AROMATIC/ALIPHATIC BLENDS

| AROMATIC/ALIPHATIC (MW 1000)/ALIPHATIC (MW 2000) (WEIGHT RATIO) | BD | | 100/0/0 | | 70/30/0 | | 70/0/30 | |
|---|---|---|---|---|---|---|---|---|
| | BEFORE | AFTER | BEFORE | AFTER | BEFORE | AFTER | BEFORE | AFTER |
| TENSILE PROPERTY | | | | | | | | |
| 100% MODULUS (PSI) | 1173 | 1032(88) | 1839 | 1699(92) | 1549 | 1404(91) | 1612 | 1492(93) |
| 200% MODULUS (PSI) | 1605 | 1392(87) | 2269 | 2082(92) | 1960 | 1756(90) | 2002 | 1849(92) |
| 300% MODULUS (PSI) | 2195 | 1807(82) | 2703 | 2429(89) | 2403 | 2089(87) | 2408 | 2176(90) |
| % ELONGATION | 484 | 636 | 495 | 564 | 530 | 712 | 539 | 604 |
| ENERGY TO BREAK (Lb-in) (AREA UNDER STRESS-STRAIN CURVE) | 357 | 457 | 420 | 424 | 411 | 490 | 422 | 405 |
| HARDNESS, SHORE-A (D) | 93(47) | 89(40) | 97(52) | 97(51) | 96(51) | 95(49) | 96(50) | 95(49) |

CONDITIONS: TEMPERATURE: 80° C., TIME = 2 WEEKS.
NOTE: VALUES IN THE PARENTHESES ARE THE PERCENTAGE OF PROPERTY RETAINED AFTER THE WATER IMMERSION.

TABLE 18

DEVELOPMENTAL LIQUID OR VERY LOW MELTING
AROMATIC DIOL CHAIN EXTENDER SYSTEMS

| AROMATIC/ALIPHATIC 1 = MW 1000 2 = MW 2000 BLEND SYSTEMS<br>CHAIN EXTENDERS: | AROMATIC | BLEND 1 | BLEND 2 | BLEND 3 |
|---|---|---|---|---|
| AROMATIC/ALIPHATIC-1/ALIPHATIC-2 (WT. RATIO) | 100% | 30/60/10 | 30/50/20 | 30/40/30 |
| PHYSICAL FORM: | SEMI SOLID-LIQUID | SEMI SOLID-LIQUID | SEMI SOLID-LIQUID | SEMI SOLID-LIQUID |
| MELTING POINT (° C.): (DSC ONSET TEMP.) | 65.6 | ND | ND | ND |
| VISCOSITY (POISE) AT: | | | | |
| 80° C. | | 0.5 | 0.9 | 1 | 2.4 |
| 70° C. | | 0.7 | ND | 1.5 | 3.3 |
| 60° C. | | 1.3 | 2.2 | 2.3 | 5.2 |
| 50° C. | | 3 | ND | 3.7 | 8 |

TABLE 18-continued

DEVELOPMENTAL LIQUID OR VERY LOW MELTING AROMATIC DIOL CHAIN EXTENDER SYSTEMS

AROMATIC/ALIPHATIC 1 = MW 1000 2 = MW 2000 BLEND SYSTEMS

| CHAIN EXTENDERS: | AROMATIC | BLEND 1 | BLEND 2 | BLEND 3 |
|---|---|---|---|---|
| 40° C. | 6.7 | 6.1 | 6.3 | 13.6 |
| 35° C. | 9.9 | 8 | 8.5 | 17.5 |

VISCOSITY MEASUREMENTS WERE DETERMINED USING BROOKFIELD VISCOMETER USING SPINDLE #6 UNDER CONTROLLED TEMPERATURE CONDITIONS.
AROMATIC AND BLENDS STAYED LIQUID AT ROOM TEMPERATURE FOR A PERIOD OF SEVERAL WEEKS AFTER MELTED.

TABLE 19

CAST POLYURETHANES FROM AROMATIC/ALIPHATIC BLENDS AND BAYTEC ME-050 PREPOLYMER

| AROMATIC/ALIPHATIC (MW 1000)/ALIPHATIC (MW 2000) (WEIGHT RATIO) | 30/60/10 | 30/50/20 | 30/40/30 |
|---|---|---|---|
| CASTING CONDITIONS | | | |
| PREPOLYMER TEMPERATURE, ° C. | 85 | 85 | 85 |
| BLEND TEMPERATURE, ° C. | 85 | 85 | 85 |
| MIX RATIO (PREPOLYMER/LEND) | 100/33.1 | 100/34 | 100/34.9 |
| STOICHIOMETRY, % THEORY | 95 | 95 | 95 |
| CURE, HR/° C. | 16/119 | 16/110 | 16/100 |
| TENSILE PROPERTY | | | |
| 100% MODULUS (PSI) | 544 | 538 | 542 |
| 200% MODULUS (PSI) | 767 | 760 | 774 |
| 300% MODULUS (PSI) | 1170 | 1153 | 1189 |
| TENSILE STRENGTH (PSI) | 1644 | 2632 | 3600 |
| % ELONGATION | 355 | 413 | 432 |
| ENERGY TO BREAK (Lb-in) (AREA UNDER STRESS-STRAIN CURVE) | $10^8$ | 155 | 180 |
| TEAR STRENGTH, DIE C (Lb-in) | 296 | 325 | 322 |
| COMPRESSION SET, % | 42.7 | 41.1 | 30.7 |
| BASHORE REBOUND, % | 71 | 72 | 73 |
| HARDNESS, SHORE-A(D) | 76(29) | 75(29) | 75(28) |

What is claimed is:

1. A diol blend comprising:
   a) an aromatic diol portion comprising a mixture of compounds having the general formula (1)

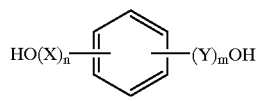

(1)

wherein each X and Y is the same or different and is independently selected from the group consisting of substituted or unsubstituted alkoxy groups, and wherein n is between 1 and 4 and m is between 1 and 4, such that the sum of n and m is, on average, greater than 2, and wherein said aromatic diol portion is the reaction product of dihydric phenol and one or more alkylene carbonates using a stoichiometric excess of carbonate; and
   b) an aliphatic diol portion.

2. The diol blend of claim 1 wherein X and Y are independently selected from the group consisting of alkoxy groups having the formula $C_aH_{2a}O$, wherein a is between 2 and 5.

3. The diol blend of claim 2 wherein X and Y are independently selected from the group consisting of straight chain alkoxy groups wherein a equals 2 and branched chain alkoxy groups wherein a equals 3.

4. The diol blend of claim 1, wherein the aliphatic diol portion is polytetramethylene ether glycol.

5. The diol blend of claim 1, wherein the aromatic diol portion is prepared by reacting resorcinol and ethylene carbonate in a ratio of between about 1:2.05 and 1:3 and wherein the aliphatic diol portion is polytetramethylene ether glycol having a molecular weight between about 1000 and 2000, or a mixture thereof.

6. A method for synthesizing a diol blend having an aromatic diol portion and an aliphatic diol portion comprising:
   a) mixing a dihydric phenol with one or more alkylene carbonates using a stoichiometric excess of carbonate;
   b) reacting the mixture of step a) at a temperature sufficient to initiate and maintain evolution of $CO_2$ for a length of time sufficient to achieve the desired reaction of said dihydric phenol and one or more alkylene carbonates;
   c) cooling the mixture of step b);
   d) adding one or more diols to the mixture of step c) wherein steps a) through d) are performed in an inert atmosphere.

7. The method of claim 6 wherein said alkylene carbonate is selected from the group comprising ethylene carbonate, propylene carbonate and mixtures thereof.

8. The method of claim 6 wherein the mixture of step a) further comprises a catalyst selected from the group comprising triaryl, trialkyl, trialkylaryl and mixed aryl/alkyl triorganophosphine compounds; alkali metal salts, hydroxides and carbonates; and alkali earth metal salts, hydroxides and carbonates.

9. The method of claim 8 wherein said catalyst is triphenylphosphine.

10. A cast elastomer comprising an MDI-based polyether prepolymer having an NCO content between about 2 and 23 weight percent and the diol blend of claim 1.

11. The cast elastomer of claim 10, wherein said prepolymer is a diisocyanate prepolymer.

12. The cast elastomer of claim 11, wherein said aromatic diol portion has been prepared by reacting 1 mole of resorcinol with between about 2.05 and 3.0 moles of ethylene carbonate, propylene carbonate or mixtures thereof.

13. The cast elastomer of claim 12, wherein said aliphatic diol derives from polytetramethylene ether glycol.

14. The cast elastomer of claim 10 wherein said elastomer has a rebound of at least 70%.

15. The cast elastomer of claim 1, wherein the tan delta value at 25° C. is 0.2 or lower.

16. A golf ball comprising the cast elastomer of claim 10.

17. A recreational wheel comprising the cast elastomer of claim 10.

18. A seal comprising the cast elastomer of claim 10.

19. A gasket comprising the cast elastomer of claim 10.

20. A method of preparing a cast elastomer comprising using the diol blend of claim 1 as the chain extender in the formulation of said elastomer.

* * * * *

UNITED STATES PATENT AND TRADEMARK OFFICE
CERTIFICATE OF CORRECTION

PATENT NO.    : 6,303,732 B1
DATED         : October 16, 2001
INVENTOR(S)   : Raj B. Durairaj It is certified that error appears in the above-identified patent and that said Letters Patent is hereby corrected as shown below:

Column 1,
Lines 45, 48, 51, 53, 54, 59, 61 and 62, "βhydroxyethyl" should read -- β-hydroxyethyl --.

Column 2,
Lines 7, 8 and 14, "βhydroxyethyl" should read -- β-hydroxyethyl --.

Column 5,
Lines 24 and 66, "βhydroxyethyl" should read -- β-hydroxyethyl --.

Column 6,
Lines 6, 11 and 25, "βhydroxyethyl" should read -- β-hydroxyethyl --.
Line 67, "$C_1$-$C_8$" should read -- $C_1$-$C_{18}$ --.

Column 8,
Line 63, "βhydroxyethyl" should read -- β-hydroxyethyl --.

Column 12,
Line 8, "500º" should read -- 50º --.
Line 20, "1 10º" should read -- 110º --.
Line 21, "Terathanee" should read -- Terathane --.
Line 52, "as" should read -- was --.
Line 61, "40%" should read -- 60% --.
Line 63, "30%" should read -- 10% --.

Column 14,
Line 1, "Terathane®" should read -- Terathanes® --.
Line 65, insert -- For -- prior to "example".

Columns 19-20,
Table 4, across from PEAK TEMP., Tg (ºC.), under heading 2900 70/30 "69.3" should read -- 69.3 --.

Columns 25-26,
Table 8, "C./28" in title should read -- C./6 --.
Table 9, column headed "AROMATIC/ALIPRATIC BLENDS" should read -- AROMATIC/ALIPHATIC BLENDS --.

UNITED STATES PATENT AND TRADEMARK OFFICE
CERTIFICATE OF CORRECTION

PATENT NO. : 6,303,732 B1
DATED : October 16, 2001
INVENTOR(S) : Raj B. Durairaj It is certified that error appears in the above-identified patent and that said Letters Patent is hereby corrected as shown below:

<u>Columns 27-28,</u>
Table 9-continued, $3^{rd}$ row, "STRESS STRAIN CURVE AREA)" should read
-- (STRESS-STRAIN CURVE AREA) --.
Table 9-continued, $6^{th}$ row, "AROMATIC/ALIPRATIC BLENDS" should read
-- AROMATIC/ALIPHATIC BLENDS --.
Table 9-continued, $15^{th}$ row, "STRESS STRAIN CURVE AREA)" should read
-- (STRESS-STRAIN CURVE AREA) --.

<u>Columns 35-36,</u>
Table 19, under column entitled CASTING CONDITIONS, $3^{rd}$ row,
"(PREPOLYMERI/LEND)" should read -- (PREPOLYMER/BLEND) --.
Table 19, under row entitled CURE, HR/$^{\circ}$ C., $1^{st}$ column "16/119" should read
-- 16/110 --.
Table 19, under row entitled ENERGY TO BREAK (Lb-in), $1^{st}$ column "$10^8$" should read -- 108 --.

<u>Column 38,</u>
Line 7, "claim 1" should read -- claim 10 --.

Signed and Sealed this

Fifth Day of November, 2002

Attest:

JAMES E. ROGAN
*Attesting Officer*  *Director of the United States Patent and Trademark Office*